United States Patent [19]

Kawashima et al.

[11] Patent Number: 5,303,144
[45] Date of Patent: Apr. 12, 1994

[54] COMPUTER AIDED PLANNING SUPPORT SYSTEM

[75] Inventors: Kazuhiro Kawashima, Yokohama; Norihisa Komoda; Keiichi Hara, both of Kawasaki; Tetsushi Tomizawa, Urawa; Kouichi Taniguchi, Yokohama; Michiko Oba, Ikeda, all of Japan

[73] Assignees: Hitachi, Ltd.; Hitachi Microcomputer System Ltd., Tokyo, Japan

[21] Appl. No.: 621,360

[22] Filed: Dec. 3, 1990

[30] Foreign Application Priority Data

Dec. 8, 1989 [JP] Japan .................................. 1-320212

[51] Int. Cl.$^5$ ...................... G06F 15/22; G06F 15/24; G06F 15/46; G06G 7/52; G06G 7/64; G06G 7/66
[52] U.S. Cl. .................................. 364/401; 364/468
[58] Field of Search ............... 364/400, 401, 403, 468; 395/68, 904, 912, 919, 921

[56] References Cited

U.S. PATENT DOCUMENTS

| 4,839,803 | 6/1989 | Kawashima et al. | 364/403 |
| 4,852,001 | 7/1989 | Tsushima et al. | 364/401 |
| 4,862,376 | 8/1989 | Ferriter et al. | 364/468 |
| 4,896,269 | 1/1990 | Tong | 364/468 |
| 4,947,322 | 8/1990 | Tenma et al. | 364/401 |
| 5,053,970 | 10/1991 | Kurihara et al. | 364/468 |

FOREIGN PATENT DOCUMENTS

| 152657 | 7/1987 | Japan | 364/401 |
| 121155 | 5/1989 | Japan | 364/468 |
| 257553 | 10/1989 | Japan | 364/401 |

OTHER PUBLICATIONS

Kazuhiro Kawashima, et al., "Precompiler for Process Logic Description Language in Intelligent Planning Support System", published in The Papers of Information Processing Society of Japan, vol. 28, No. 9, Sep. 1987, pp. 975-986. (English translation unavailable).

Kazuhiro Kawashima, et al., "Precompiler for Process Logic description Language in Intelligent Planning Support System", issued by IEEE, 1987, pp. 649-655. (provided in English).

Primary Examiner—Roy N. Envall, Jr.
Assistant Examiner—Stephen R. Tkacs
Attorney, Agent, or Firm—Fay, Sharpe, Beall, Fagan, Minnich & McKee

[57] ABSTRACT

The computer aided planning support system of this invention is constructed of a planning information input device from which an object data for making a plan is inputted; an object data storage unit for storing the inputted object data; a planning unit for making a plan by reading the object data stored in the object data storage unit and processing the read-out data in accordance with a planning program; a planning data storage unit for storing the data associated with the plan made by the planning unit; a planning data processing unit for processing the planning data stored in the planning data storage unit in accordance with a predetermined scheduling function and sending the processed data to the planning unit; and a planning information output device for outputting the planning result generated by the planning unit in the form a user can use it.

23 Claims, 32 Drawing Sheets

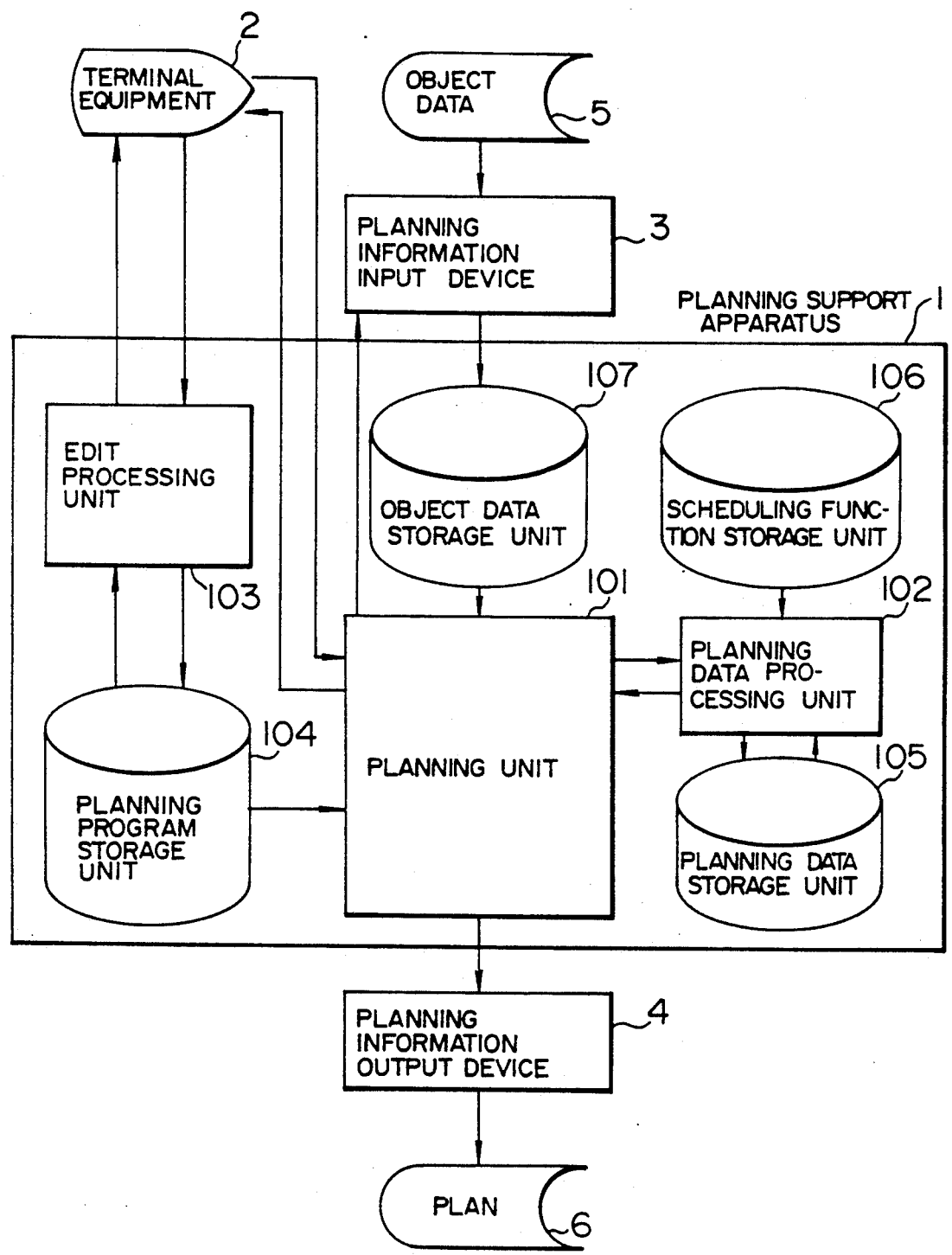
F I G. 1

PLANNING OUTPUT DISPLAY

FIG. 5

PLANNING DATA

| | RESOURCE No. 501 | JOB No. 502 | START TIME 503 | END TIME 504 | 505 | 506 |
|---|---|---|---|---|---|---|
| 1 | 2 | 1 | 17 | 20 | | ... |
| 2 | 1 | 2 | 5 | 8 | | |
| 3 | 3 | 5 | 12 | 16 | | |
| 4 | 1 | 3 | 1 | 3 | | |
| 5 | 0 | 0 | 0 | 0 | | |
| 6 | 3 | 3 | 5 | 9 | | |
| 7 | 1 | 1 | 11 | 16 | | |
| 8 | 2 | 5 | 4 | 10 | | |
| 9 | 0 | 0 | 0 | 0 | | |
| 10 | 0 | 0 | 0 | 0 | | |

500

Rows 1–8: REGISTRATION AREA
Rows 9–10: NON-REGISTRATION AREA

FIG. 6
POINTER TABLE
(IN THE ORDER OF EARLIER TIME)

| RESOURCE No. | RESOURCE HEAD POINTER |
|---|---|
| 1 | 4 |
| 2 | 8 |
| 3 | 6 |

601

| PLANNING TABLE ROW No. | RESOURCE NEXT POINTER | JOB NEXT POINTER |
|---|---|---|
| 1 | 0 | 0 |
| 2 | 7 | 0 |
| 3 | 0 | 0 |
| 4 | 2 | 6 |
| 5 | 0 | 0 |
| 6 | 3 | 0 |
| 7 | 0 | 1 |
| 8 | 1 | 3 |
| 9 | 0 | 0 |
| 10 | 0 | 0 |

602  603

| JOB No. | JOB HEAD POINTER |
|---|---|
| 1 | 7 |
| 2 | 2 |
| 3 | 4 |
| 4 | 0 |
| 5 | 8 |
| 6 | 0 |
| 7 | 0 |
| 8 | 0 |

604

| VACANT POINTER |
|---|
| 5 |

605

| NON-REGISTERED POINTER |
|---|
| 9 |

```
/*** PLANNING DATA REGISTRATION PROGRAM ***/
p_add (data, size):            /*** data: REGISTRATION DATA, size: DATA NUMBER ***/    ~701
 .
 .
 .
end p_add:

/*** PLANNING DATA DELETION PROGRAM ***/
p_del (data, size):            /*** data: DELETION CONDITION, size: CONDITION NUMBER ***/    ~702
 .
 .
 .
end p_del:

/*** PLANNING DATA REFERENCE PROGRAM ***/
p_ref(data1,size1,data2,size2):  /*** data1: REFERENCE CONDITION, size1: CONDITION NUMBER ***/
                                 /*** data2: REFERENCE DATA, size2: DATA NUMBER ***/    ~703
 .
 .
 .
end p_ref:

/*** PRE-JOB REFERENCE PROGRAM ***/
prejob(res,time)               /*** res: RESOURCE, time: TIME ***/    ~704
 .
 .
 .
end prejob:

/*** POST-JOB REFERENCE PROGRAM ***/
postjob(res,time)              /*** res: RESOURCE, time: TIME ***/    ~705
 .
 .
 .
end postjob:

/*** PRE-RESOURCE REFERENCE PROGRAM ***/
preres(job,time)               /*** job: JOB, time: TIME ***/    ~706
 .
 .
 .
end preres:

/*** POST-RESOURCE REFERENCE PROGRAM ***/
posres(job,time):              /*** job: JOB, time: TIME ***/    ~707
 .
 .
 .
end posres:
```

FIG. 8

```
/*** SUM PROGRAM FOR TIME ALLOCATED TIME ***/
                        /***stime:START TIME OF SUM ***/
                        /***etime:END TIME OF SUM ***/
tatime(stime,etime):
     .
     .
     .
end tatime:                                                    ─ 801

/*** SUM PROGRAM FOR JOB ALLOCATED TIME ***/
                        /*job:JOB*/
jatime(job):
     .
     .
     .
end jatime:                                                    ─ 802

/*** SUM PROGRAM FOR RESOURCE ALLOCATED TIME ***/
                        /*res:RESOURCE*/
ratime(res):
     .
     .
     .
end ratime:                                                    ─ 803

/*** SUM PROGRAM FOR JOB/RESOURCE ALLOCATED TIME ***/
                        /*job:JOB, res:RESOURCE*/
jrtime(job,res):
     .
     .
     .
end jrtime:                                                    ─ 804

/*** SUM PROGRAM FOR JOB/PERIOD ALLOCATED TIME ***/
                        /*job:JOB*/
                        /***stime:START TIME OF SUM ***/
                        /***etime:END TIME OF SUM ***/
jttime(job,stime,etime):
     .
     .
     .
end jttime:                                                    ─ 805

/*** SUM PROGRAM FOR JOB/PERIOD ALLOCATED TIME ***/
                        /*res:RESOURCE*/
                        /***stime:START TIME OF SUM ***/
                        /***etime:END TIME OF SUM ***/
rttime(res,stime,etime):
     .
     .
     .
end rttime:                                                    ─ 806
```

FIG. 9

```
/*** SEARCH PROGRAM FOR EARLIEST START ENABLED TIME ***/        ~901
fstime(res,opetime,stime):      /*** res:RESOURCE,opetime:OPERATION TIME ***/
                                /*** stime:SEARCH START TIME ***/
    .
    .
    .
end fstime:

/*** SEARCH PROGRAM FOR LATEST START ENABLED TIME ***/          ~902
lstime(res,opetime,etime):      /*** res:RESOURCE, opetime:OPERATION TIME ***/
                                /*** etime:SEARCH END TIME ***/
    .
    .
    .
end lstime:

/*** SEARCH PROGRAM FOR EARLIEST END ENABLED TIME ***/          ~903
fetime(res,opetime,stime):      /*** res:RESOURCE, opetime:OPERATION TIME ***/
                                /*** stime:SEARCH START TIME ***/
    .
    .
    .
end fetime:

/*** SEARCH PROGRAM FOR LATEST END ENABLED TIME ***/            ~904
letime(res,opetime,etime):      /*** res:RESOURCE, opetime:OPERATION TIME ***/
                                /*** etime:SEARCH END TIME ***/
    .
    .
    .
end letime:

/*** SEARCH PROGRAM FOR JOB ALLOCATED START TIME ***/           ~905
jstime(job):                    /*** job:JOB ****/
    .
    .
    .
end jstime:

/*** SEARCH PROGRAM FOR JOB ALLOCATED END TIME ***/             ~906
jetime(job):                    /*** job:JOB ****/
    .
    .
    .
end jetime:

/*** SEARCH PROGRAM FOR RESOURCE ALLOCATED START TIME ***/      ~907
rstime(job):                    /*** job:JOB ****/
    .
    .
    .
end rstime:

/*** SEARCH PROGRAM FOR RESOURCE ALLOCATED END TIME ***/        ~908
retime(job)                     /*** job:JOB ****/
    .
    .
    .
end retime:
```

F I G. 15A
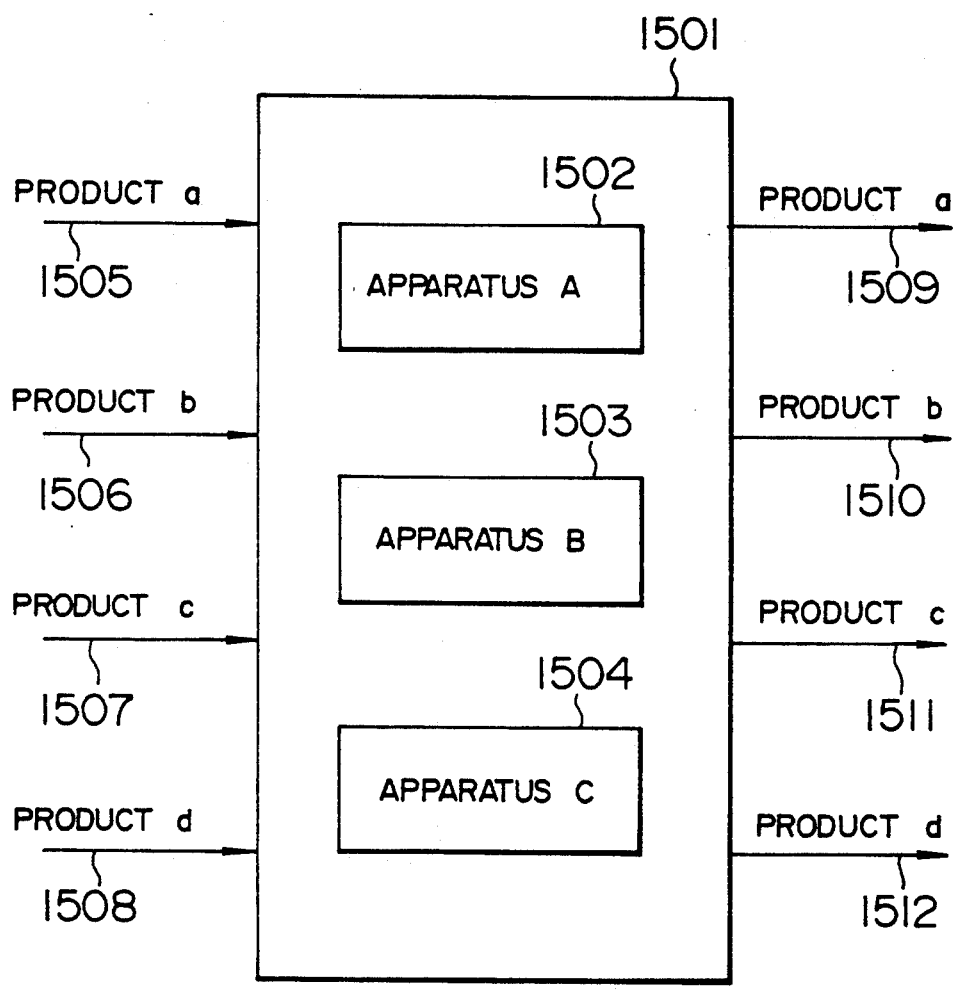

FIG. 15B

ABILITY TABLE

| APPARATUS NAME | PRODUCT NAME | PRODUCTION ABILITY | |
|---|---|---|---|
| A | a | 1 | ⎫ 1513 |
| A | b | 2 | |
| B | b | 2 | |
| B | c | 2 | |
| C | c | 1 | |
| C | d | 2 | |
| ・・・ | ・・・ | 5 | |

(MINUTE / EACH PRODUCT)

FIG. 16A

JOB DATA

| JOB No. | PRODUCT NAME | NUMBER OF PRODUCT | TIME POSSIBLE TO START | DUE DATE | . . . |
|---|---|---|---|---|---|
| 1 | a | 100 | 0 | 10 | . . . |
| 2 | a | 50 | 0 | 10 | . . . |
| 3 | b | 100 | 5 | 10 | . . . |
| 4 | c | 50 | 5 | 15 | . . . |
| 5 | a | 100 | 5 | 15 | . . . |
| 6 | d | 50 | 5 | 15 | . . . |
| 7 | c | 100 | 5 | 20 | . . . |
| 8 | b | 50 | 10 | 20 | . . . |
| . . . | . . . | . . . | . . . | . . . | . . . |
| 1601 | 1602 | 1603 | 1604 | 1605 | |

FIG. 16B

RESOURCE DATA

| RESOURCE No. | APPARATUS NAME | SERVICE START TIME | SERVICE END TIME | . . . |
|---|---|---|---|---|
| 1 | A | 5 | 20 | . . . |
| 2 | B | 0 | 20 | . . . |
| 3 | C | 0 | 24 | . . . |
| 1606 | 1607 | 1608 | 1609 | |

FIG. 18

SPARE TIME TO DUE DATE

| | |
|---|---|
| block(SPARE TIME TO DUE DATE) | ~1801 |
| for(r,j) where<br>  r is one of RESOURCES,<br>  j is one of JOBS, | ~1802 |
| logic: | ~1803 |
| /\*\*\*DEFINITION OF SPARE TIME TO DUE DATE \*\*\*/<br><br>if(DUE DATE CONSTRAINTS(r,j).EQ.'OK').AND.(APPARATUS CONSTRAINTS(r,j).EQ.'OK'))<br>  then SPARE TIME TO DUE DATE (r,j)<br>    = LATEST START TIME (r,j) − EARLIEST START TIME (r,j):<br>LATEST START TIME (r,j)<br>  = lstime(RESOURCE NO(r), JOB EXECUTION TIME(r,j), DUE DATE (j)):<br>EARLIEST START TIME (r,j)<br>  = fstime(RESOURCE NO(r), JOB EXECUTION TIME (r,j), TIME POSSIBLE TO START (j)): | ~1804 |
| /\*\*\*DEFINITION OF DUE DATE CONSTRAINTS \*\*\*/<br>if (EARLIEST END TIME (r,j).LE.DUE DATE(j))<br>  then DUE DATE CONSTRAINTS (r,j) = 'OK',<br>  else DUE DATE CONSTRAINTS (r,j) = 'NG':<br>EARLIEST END TIME (r,j)<br>  = fetime(RESOURCE NO (r), JOB EXECUTION TIME (r,j), TIME POSSIBLE TO START (j)): | ~1805 |
| /\*\*\*DEFINITION OF APPARATUS CONSTRAINTS \*\*\*/<br>if(WORKING RATE OF APPARATUS(r,j).LE.80)<br>  then DUE DATE CONSTRAINTS(r,j) = OK,<br>  else DUE DATE CONSTRAINTS(r,j) = NG:<br>WORKING RATE OF APPARATUS (r,j)<br>  = ESTIMATED APPARATUS ALLOCATED TIME(r,j)/SERVICEABLE TIME (r) \* 100:<br>ESTIMATED APPARATUS ALLOCATED TIME (r,j)<br>  = JOB EXECUTION TIME (r,j) + APPARATUS ALLOCATED TIME (r):<br>APPARATUS ALLOCATED TIME (r) = ratime(RESOURCE NO(r)):<br>SERVICEABLE TIME (r)<br>  = SERVICE END TIME (r) − SERVICE START TIME (r): | ~1806 |
| /\*\*\*DEFINITION OF JOB EXECUTION TIME \*\*\*/<br>JOB EXECUTION TIME (r,j) = PRODUCTION ABILITY (r,j) \* PRODUCT NUMBER (j) / 60:<br>PRODUCTION ABILITY (r,j)<br>  = ABILITY TABLE (APPARATUS NAME (r), PRODUCT NAME (j)): | ~1807 |
| end logic : | ~1808 |
| end block: | ~1809 |

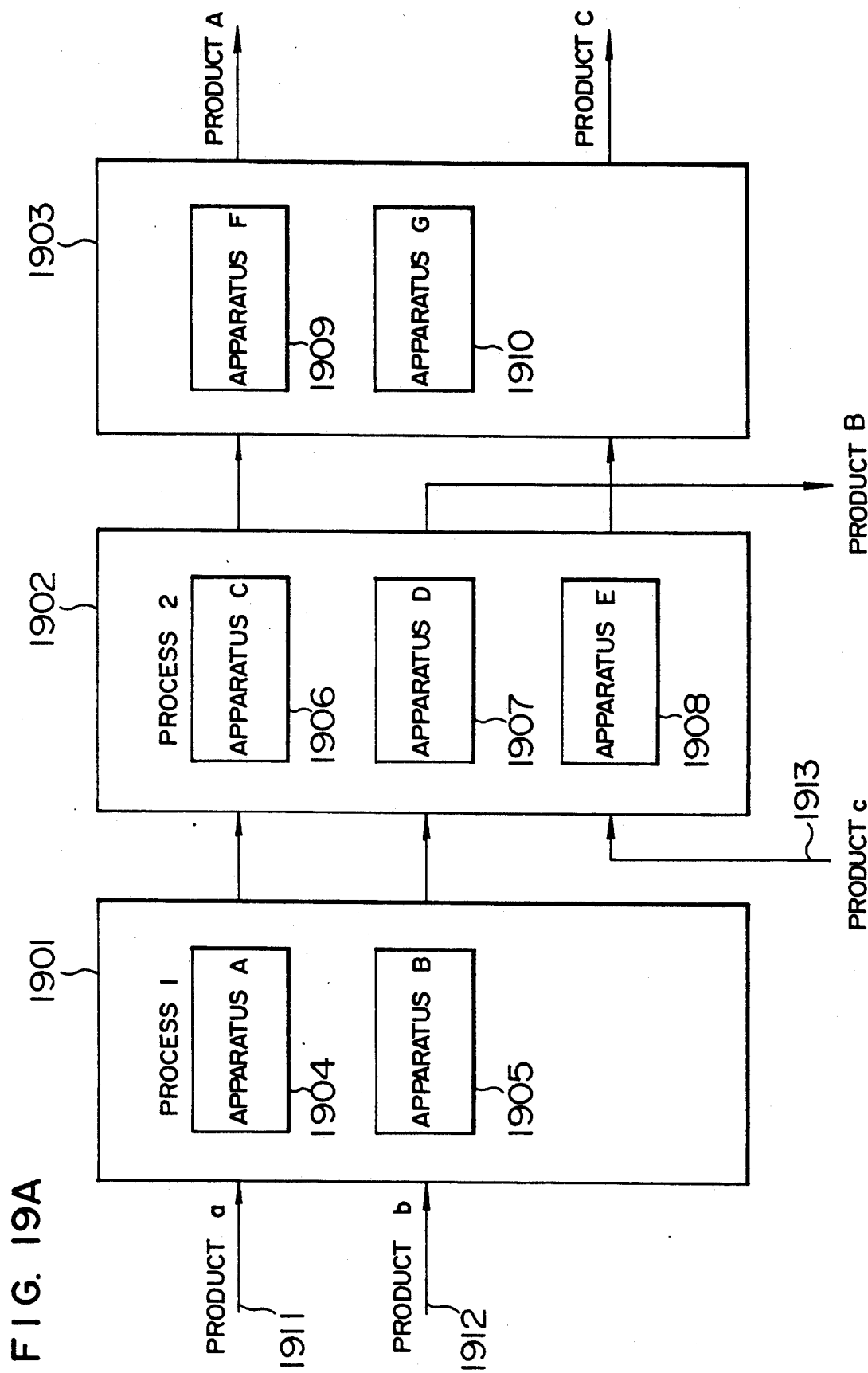

FIG. 19B

ABILITY TABLE

| APPARATUS NAME | PRODUCT NAME | PRODUCTION ABILITY |
|---|---|---|
| A | a | 1 |
| A | b | 2 |
| B | a | 2 |
| B | b | 1 |
| C | a | 2 |
| C | b | 2 |
| ... | ... | ... |

RESOURCE 1

| DAY OF WEEK \ TIME ZONE | 1 | 2 | 3 | 4 | 5 |
|---|---|---|---|---|---|
| MON. | JOB 1 |  | JOB 6 |  |  |
| TUE. |  | JOB 2 |  |  |  |
| WED. | JOB 3 |  | JOB 4 |  |  |
| THR. |  | JOB 8 |  |  |  |
| FRI. |  |  |  |  |  |

FIG. 22B

RESOURCE 2

| DAY OF WEEK \ TIME ZONE | 1 | 2 | 3 | 4 | 5 |
|---|---|---|---|---|---|
| MON. | JOB 1 | JOB 7 |  |  |  |
| TUE. |  | JOB 2 |  | JOB 12 |  |
| WED. | JOB 3 |  | JOB 4 |  |  |
| THR. | JOB 9 |  |  | JOB 11 |  |
| FRI. |  | JOB 10 |  |  |  |

FIG. 26

SIMILARITY

| | |
|---|---|
| block(SIMILARITY): | 2601 |
| for (x,y) where<br>    x is one of JOB<br>    y is one of JOB CASE | 2602 |
| logic: | 2603 |
| /\*\*\*DEFINITION OF SIMILARITY \*\*\*/<br>if(PRODUCT NAME(x).EQ. PRODUCT NAME(y))<br>  then SIMILARITY(x,y)<br>    = JOB AMOUNT SIMILARITY(x,y) + JOB EXECUTION TIME SIMILARITY(x,y): | 2604 |
| /\*\*\*DEFINITION OF JOB AMOUNT SIMILARITY \*\*\*/<br>if(WORKING RATE(y).LE.50)<br>  then JOB AMOUNT SIMILARITY(x,y) = NUMBER OF PRODUCT(x)/NUMBER OF PRODUCT(y):<br>  else JOB AMOUNT SIMILARITY(x,y) = NUMBER OF PRODUCT(y)/NUMBER OF PRODUCT(x): | 2605 |
| /\*\*\*DEFINITION OF JOB EXECUTION TIME SIMILARITY \*\*\*/<br>JOB EXECUTION TIME SIMILARITY(x,y)<br>= DUE DATE SIMILARITY(x,y) + EXECUTABLE TIME SIMILARITY(x,y):<br>if(DUE DATE(x).GE. DUE DATE(y))<br>  then DUE DATE SIMILARITY(x,y) = 1,<br>  else DUE DATE SIMILARITY(x,y) = 0:<br>if(EXECUTABLE TIME(x).LE. EXECUTABLE TIME(y))<br>  then EXECUTABLE TIME SIMILARITY(x,y) = 1,<br>  else EXECUTABLE TIME SIMILARITY(x,y) = 0: | 2606 |
| /\*\*\* DEFINITION OF WORKING RATE \*\*\*/<br>WORKING RATE(y)<br>= UNIT ALLOCATION TIME(y)/(DUE DATE(y) − EXECUTABLE TIME(y))\*100:<br>UNIT ALLOCATION TIME(y) = ALLOCATED TIME(y)/3:<br>ALLOCATED TIME(y) = totime(EXECUTABLE TIME(y), DUE DATE(y)): | 2607 |
| end logic: | 2608 |
| end block | 2609 |

FIG. 27A

SIMILARITY        INPUT OBJECT DATA

| Y \ X | 1 | 2 | 3 | 4 | 5 | 6 | 7 | 8 |
|---|---|---|---|---|---|---|---|---|
| 1 | 3 |   | 3 | 1 |   |   |   |   |
| 2 | 2 |   | 3 | 1 |   |   |   |   |
| 3 |   | 2 |   |   | 1 |   |   | 1 |
| 4 |   |   |   |   |   | 2 | 1 |   |
| 5 | 1 |   | 1 | 2 |   |   |   |   |
| 6 |   | 1 |   |   | 1 |   |   | 1 |
| 7 |   |   |   |   |   |   |   |   |

X : JOB OF INPUTTED OBJECT DATA
Y : JOB OF PRECEDENT CASE OBJECT DATA

PRECEDENT CASE

FIG. 27B

COMBINATION RESULT

| X | Y | SIMILARITY |
|---|---|---|
| 1 | 1 | 3 |
| 3 | 2 | 3 |
| 2 | 3 | 2 |
| 6 | 4 | 2 |
| 4 | 5 | 2 |
| 5 | 6 | 1 |

FIG. 28A

PRECEDENT PLANNING DATA

| RESOURCE No. | JOB No. | START TIME | END TIME |
|---|---|---|---|
| 1 | 1 | 2 | 5 |
| 1 | 2 | 8 | 9 |
| 1 | 5 | 12 | 13 |
| 2 | 3 | 1 | 8 |
| 2 | 6 | 12 | 15 |
| 3 | 4 | 6 | 10 |
| 3 | 7 | 14 | 17 |

FIG. 28B

PLANNING DATA

| RESOURCE No. | JOB No. | START TIME | END TIME |
|---|---|---|---|
| 1 | 1 | 2 | 5 |
| 1 | 3 | 8 | 9 |
| 1 | 4 | 12 | 14 |
| 2 | 2 | 2 | 9 |
| 2 | 5 | 14 | 17 |
| 3 | 6 | 6 | 13 |

FIG. 28C

NOT-ALLOCATED DATA

| NOT-ALLOCATED JOB No. |
|---|
| 7 |
| 8 |

COMPUTER AIDED PLANNING SUPPORT SYSTEM

BACKGROUND OF THE INVENTION

The present invention relates to a computer aided planning system for planning various jobs, and more particularly to a planning support system suitable for the development of a planning system dealing with various scheduling issues, and to a scheduling system using the planning support system.

A planning system which can rapidly respond to daily changes has been desired in order to solve the problems associated with making a plurality type of products with small volume and reducing intermediate inventories in a manufacturing factory. The main issue of planning, such as production scheduling, job assignment and the like, concerns optimizing a combination of various conditions. It is difficult however to develop a general planning system because the planning target changes frequently.

An example of a computer aided general purpose planning support system is described in "PRECOMPILER FOR PROCESS LOGIC DESCRIPTION LANGUAGE IN INTELLIGENT PLANNING SUPPORT SYSTEM" by Kazuhiro Kawashima, et al., the Papers of Information Processing Society of Japan, Vol. 28, No. 9, pp. 975 to 986, in September, 1987, and in the Proceedings of COMPSAC 87 with the same title at pp. 649 to 655 issued by IEEE, in 1987.

In this paper, planning software for dealing with planning issues is developed and maintained by dividing the planning logic into a process logic and a solving logic so that a large amount of data can be processed, and planning software can be changed in real time in response to daily changes.

A planning issue having a dispersed solution, such as an issue of optimizing a combination, has no general method of solving it such as conventional general linear programming. It is therefore necessary to develop a program (herainafter called "planning program" for solving an individual planning issue, posing a problem of a difficulty in constructing a planning system speedily.

SUMMARY OF THE INVENTION

The present invention has been made in consideration of the above circumstances. It is therefore an object of the present invention to solve the above-described problems and provide a planning support system capable of developing various planning systems speedily by reducing the number of steps of developing a planning program.

It is another object of the present invention to provide a scheduling system using the above planning support system.

The planning support system of this invention achieving the above objects is constructed of a planning information input device from which an object data for making a plan is inputted; an object data storage unit for storing the inputted data peculiar to the planning object such as names of resources, names of jobs and so on; a planning unit for making a plan by reading the object data stored in the object data storage unit and processing the readout data in accordance with a planning program; a planning data storage unit for storing the data (for example, combinations of resources and jobs, job assigned time and etc.) associated with the plan made by the planning unit; a planning data processing unit for processing the planning data stored in the planning data storage unit in accordance with a predetermined scheduling function and sending the processed data to the planning unit; and a planning information output device for outputting the planning result generated by the planning unit in a usable form.

According to the planning support system of this invention, the planning data storage unit does not store the specific object data, and there is provided a general unit for executing an access process to a planning data unit and the like such as for data update, addition, planning and deletion. The general unit can be used in common for the development of various planning systems. The planning support system is provided beforehand with a scheduling function data processing program. This program is used for adding, deleting, referring to the planning data, and for summing job assigned times and searching job assignable times. There is also provided a planning data processing unit for processing the planning data in accordance with the scheduling function data processing program. Therefore, for the development of a planning program, it is not necessary to prepare for each plan those programs for adding, deleting, referring to the planning data, and for summing job assigned times and searching job assignable times. Moreover, the data structures of the planning data are not required to be re-designed for each plan.

Accordingly, for the development of various planning systems, it is not necessary to describe as a planning program a complicated program for the access to the planning data for the purpose of obtaining a fast data access time. Therefore, the number of steps of developing a planning program can be reduced, and the planning system dealing with various issues can be developed easily.

Furthermore, in the scheduling system of this invention, a planning status value associated with a resource and job is calculated which value is used as a guide for making a plan. In accordance with the planning status value, the combination of resources and jobs and corresponding job assignable times are determined, thereby allowing high speed scheduling.

BRIEF DESCRIPTION OF THE DRAWINGS

FIG. 1 is a block diagram showing a first embodiment of the planning support system according to the present invention;

FIGS. 5 and 6 show examples of the contents of a planning data storage unit;

FIGS. 7 to 9 show examples of the contents of a scheduling function storage unit;

FIG. 15A shows the work processes as an object to be job scheduled;

FIG. 15B shows an ability table;

FIGS. 16A and 16B show examples of object data;

FIG. 18 shows an example of a planning program;

FIG. 19A shows the work processes as an object to be step scheduling;

FIG. 19B shows an ability table;

FIGS. 21, 22A, 22B and 23 show variations of the contents of the planning data storage unit;

FIGS. 26, 27A, 27B, 27A, 28B, and 28C show examples of data processing by the case registration unit.

DESCRIPTION OF THE PREFERRED EMBODIMENTS

Figure 2:
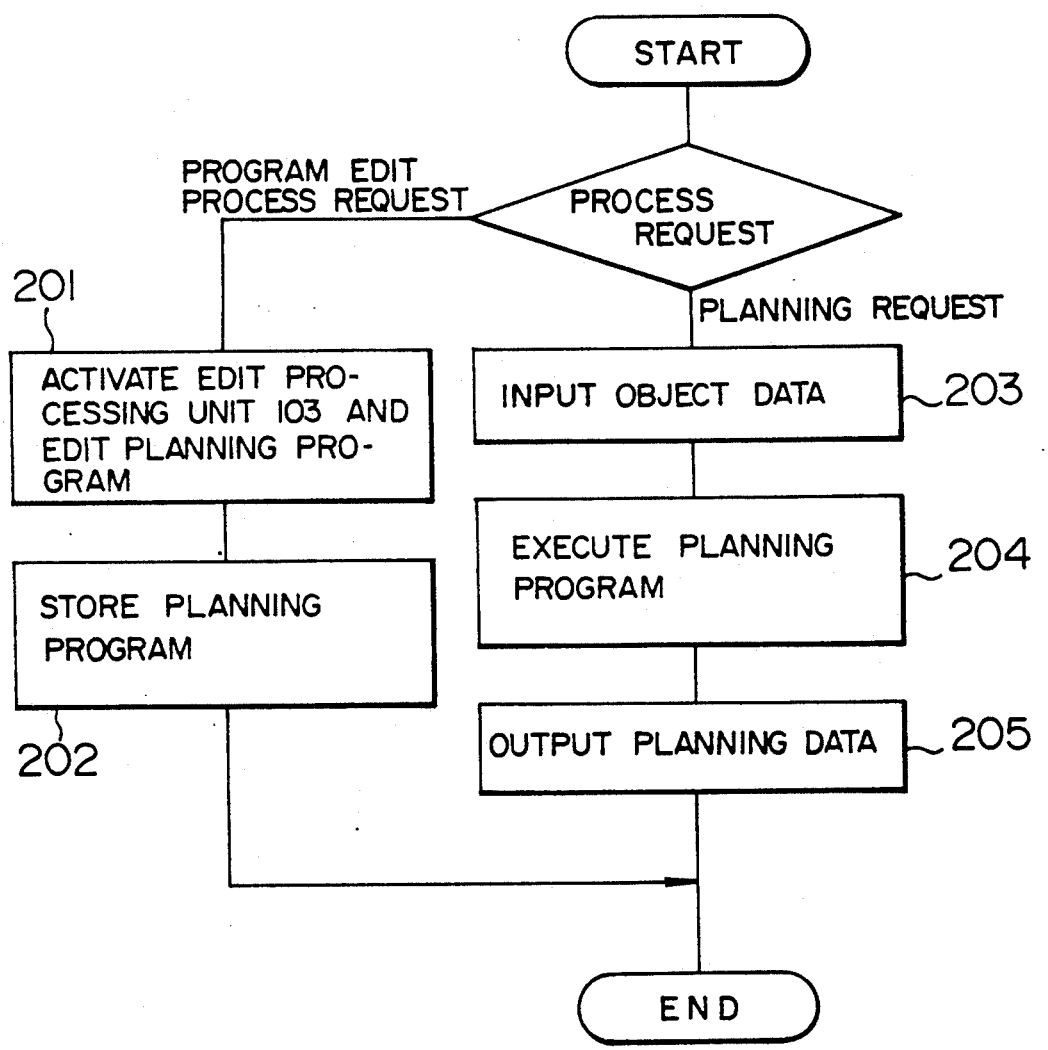
FIG. 2 is a flow chart showing the outline of the operation of the planning support system.

Preferred embodiment of this invention will now be described with reference to the accompanying drawings.

FIG. 1 is a block diagram showing the first embodiment of the planning support system according to the present invention. The planning support system of this embodiment is constructed of a planning support apparatus 1, a terminal equipment 2, a planning information input device 3, and a planning information output device 4. The planning support apparatus 1 is constructed of a computer having a CPU. The planning information input unit 3 is constructed of a data input device such as a keyboard, OCR or the like. The planning information output device 4 is constructed of a data output device such as a display unit, an electric notice board or a printer. There is another case where the planning information is inputted from another external computer via a communication network.

The planning support apparatus 1 is constructed of a planning unit 101, a planning data processing unit 102, an edit processing unit 103, a planning program storage unit 104, a planning data storage unit 105, a scheduling function storage unit 106, and an object data storage unit 107.

The outline of the operation of the planning support apparatus 1 is shown in the flow chart of FIG. 2. First a process request is entered from the terminal equipment 2. If the process request is an "edit process request" for a planning program, the edit processing unit 103 is activated to edit a planning program (step 201). The edited planning program is stored in the planning program storage unit 104 (step 202). If the entered process request is a "planning process request", an object data 5 is inputted from the planning information input device 3 into the object data storage unit 107 (step 203). The object data is attribute information of planning elements before a plan is obtained. One example of the object data is shown in FIG. 16. Using the inputted object data, the planning unit 101 makes a plan in accordance with a planning program, while the planning data processing unit 102 repeatedly refers to and updates the contents of the planning data storage unit 105 (step 204). The obtained plan is outputted via the planning information output device 4 (step 205).

Figure 3:
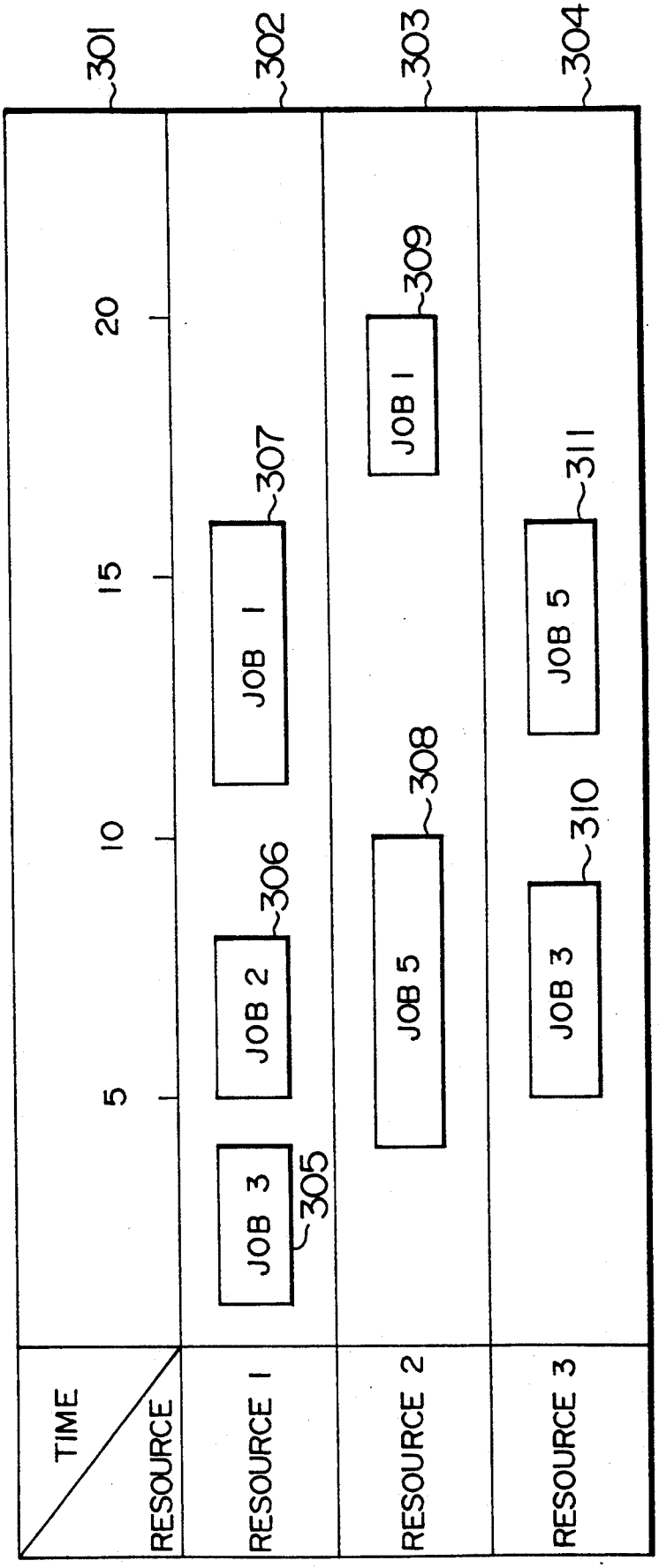
FIG. 3 shows an example of a planning result.

In this embodiment, as an example of making a plan, combinations of resources and jobs are allocated relative to the time axis shown in FIG. 3 which shows an example of an obtained and outputted plan. FIG. 3 is a gantt-chart having time 301 as its abscissa and resources 302 to 304 as its ordinate, and shows a plan of jobs assigned to each resource. A rectangle in the chart defines the start and end times of each of the jobs 305 to 311.

In this embodiment, the planning contents including intermediate results in the course of planning are stored in the planning data storage unit 105, and in accordance with a planning data processing program stored in the scheduling function storage unit 106, the planning data processing unit 102 refers to and updates the contents of the planning data storage unit 105 to thereby provide necessary information to the planning unit 101.

The contents of the planning data storage unit 105 of this embodiment are shown in FIGS. 5 and 6 which store information of the plan shown in FIG. 3 by way of example. FIG. 5 is a planning table for storing planning data, and FIG. 6 is a pointer table used for time sequentially searching from the planning table each resource and job. Stored in the planning table shown in FIG. 5 are information regarding a combination of resources and jobs indicated at 501 and 502, information regarding job start and end times for the resource/job combination indicated at 503 and 504, and other information. Stored in the pointer table shown in FIG. 6 are information regarding a resource head pointer 601, a job head pointer 604, a resource next pointer 602, a job next pointer 603, a vacant pointer 605, and a nonregistered pointer 606. The resource and job head pointers 601 and 604 each indicate the row number 500 of the planning table in which the earliest data is stored for each resource or job. The resource and job next pointers 602 and 603 each indicate the row number 500 of the planning table to be next searched. The vacant pointer 605 indicates a vacant area in the planning table The nonregistered pointer 606 indicates an area of the planning area still not registered. Provision of the pointer table prevents searching unnecessary data, reducing the search time.

Planning data processing programs stored in the scheduling function storage unit 106 of this embodiment are shown in FIGS. 7 to 9. FIG. 7 shows a program group for adding, deleting, and referring to the contents of the planning table, FIG. 8 shows a program group for summing job assigned times (differences between job start and end times) from the contents of the planning table, and FIG. 9 shows a program group for searching the time period to which a job having a certain execution time can be assigned. The add/delete/refer program group shown in FIG. 7 includes an addition program 701 for adding the registration data regarding the resource and job numbers, and job start and end times in the planning table, a deletion program 702 for deleting the contents of the planning table in accordance with the deletion conditions of the resource and job numbers, and job start and end times, a reference program 703 for deriving reference data from the contents of the planning table in accordance with the reference conditions of the resource and job numbers, and job start and end times, job reference programs 704 and 705 for referring to a job before or after a certain time for a certain resource, resource reference programs 706 and 707 for referring to a resource before or after a certain time for a certain job, and other programs. The sum program group shown in FIG. 8 includes programs 801 to 806 for summing assigned times for a certain time period, resource, and job, and for a combination thereof. The assignable time search program group shown in FIG. 9 includes programs 901 to 904 for searching the job start or end times to which a certain job execution time is assignable earliest or latest for a certain resource, programs 905 to 908 for searching the earliest assigned start time or latest assigned end time for a certain resource or job, and other programs.

Figure 4:
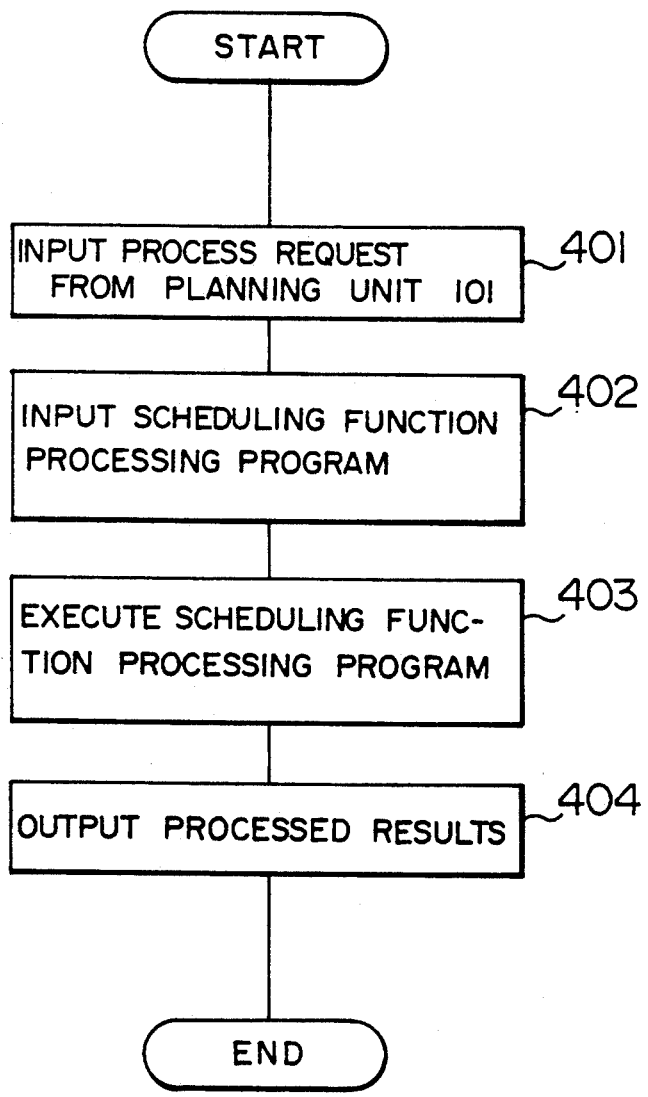
FIG. 4 is a flow chart showing the operation of a planning data processing unit.
Figure 10:
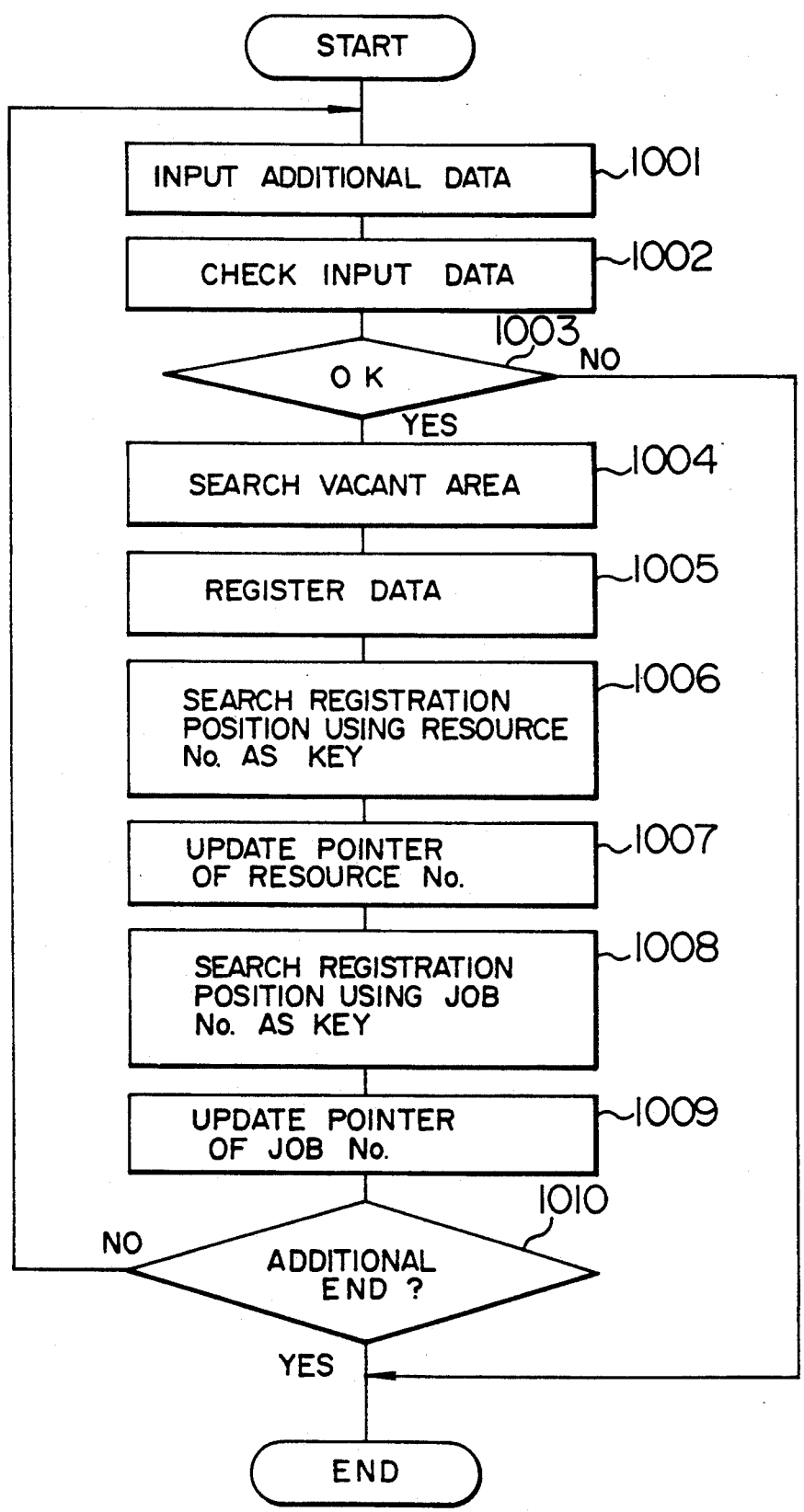
FIGS. 10 to 14 are flow charts showing the operation of a planning data processing unit.
Figure 11:
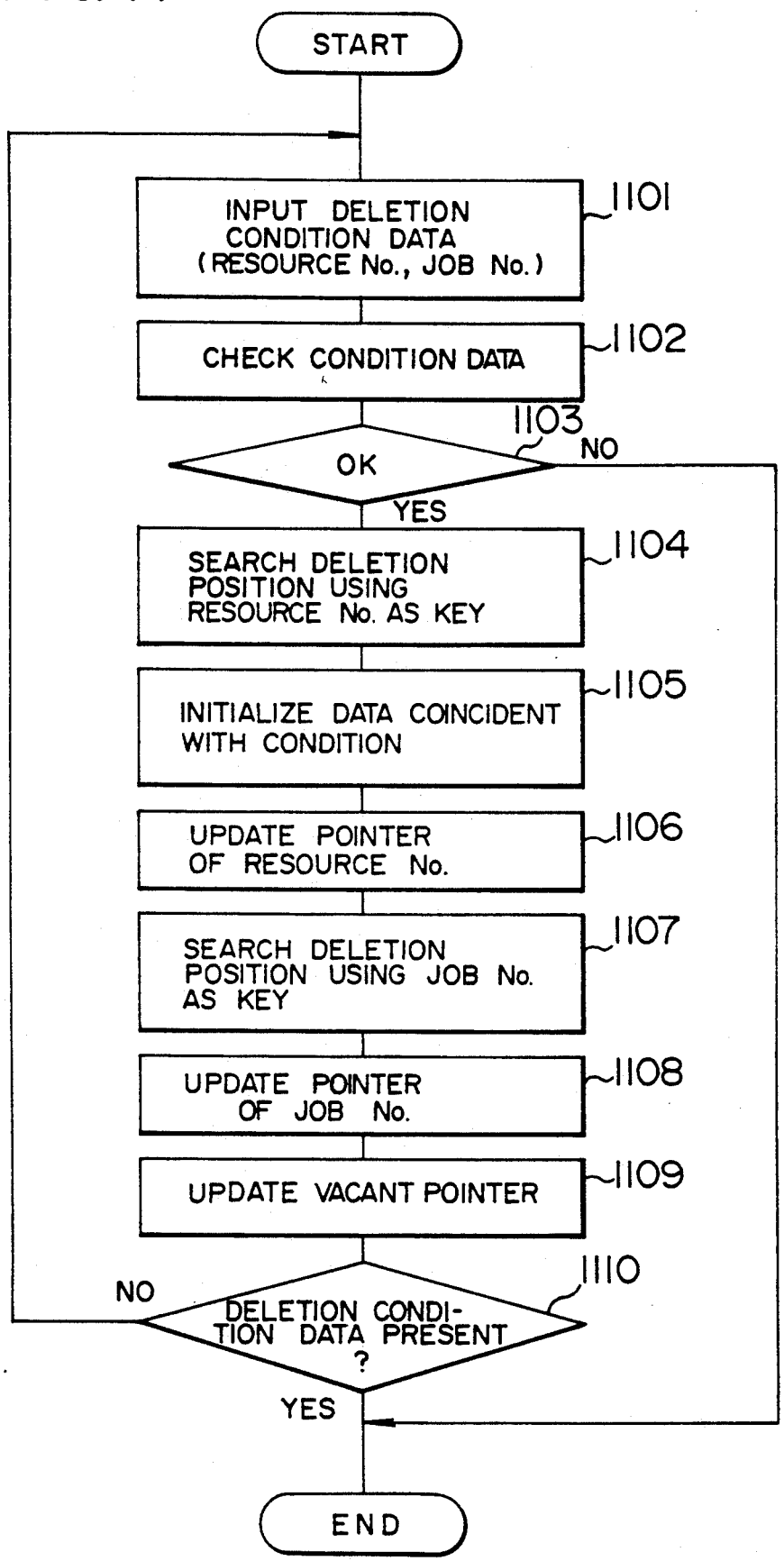
Figure 12:
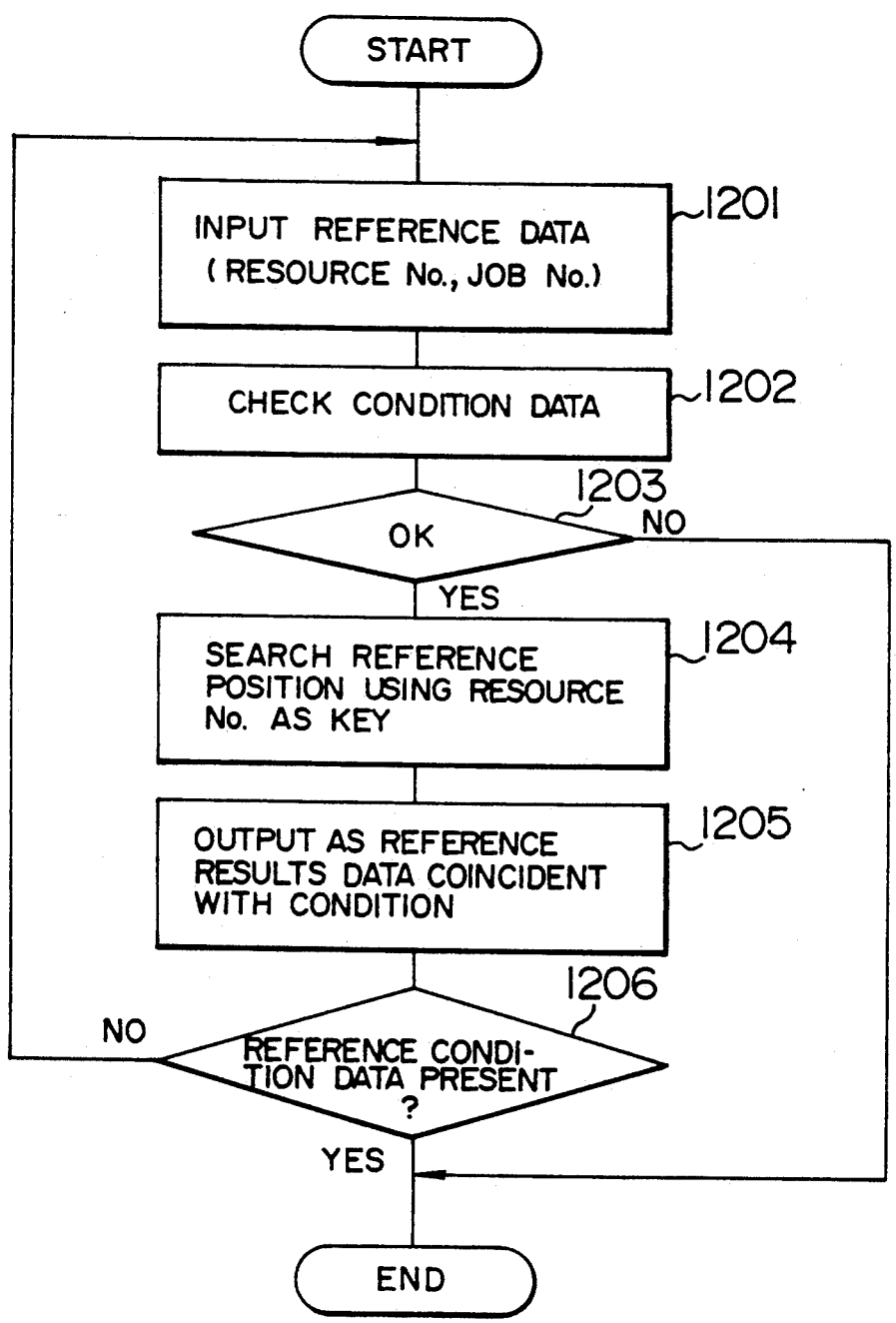
Figure 13:
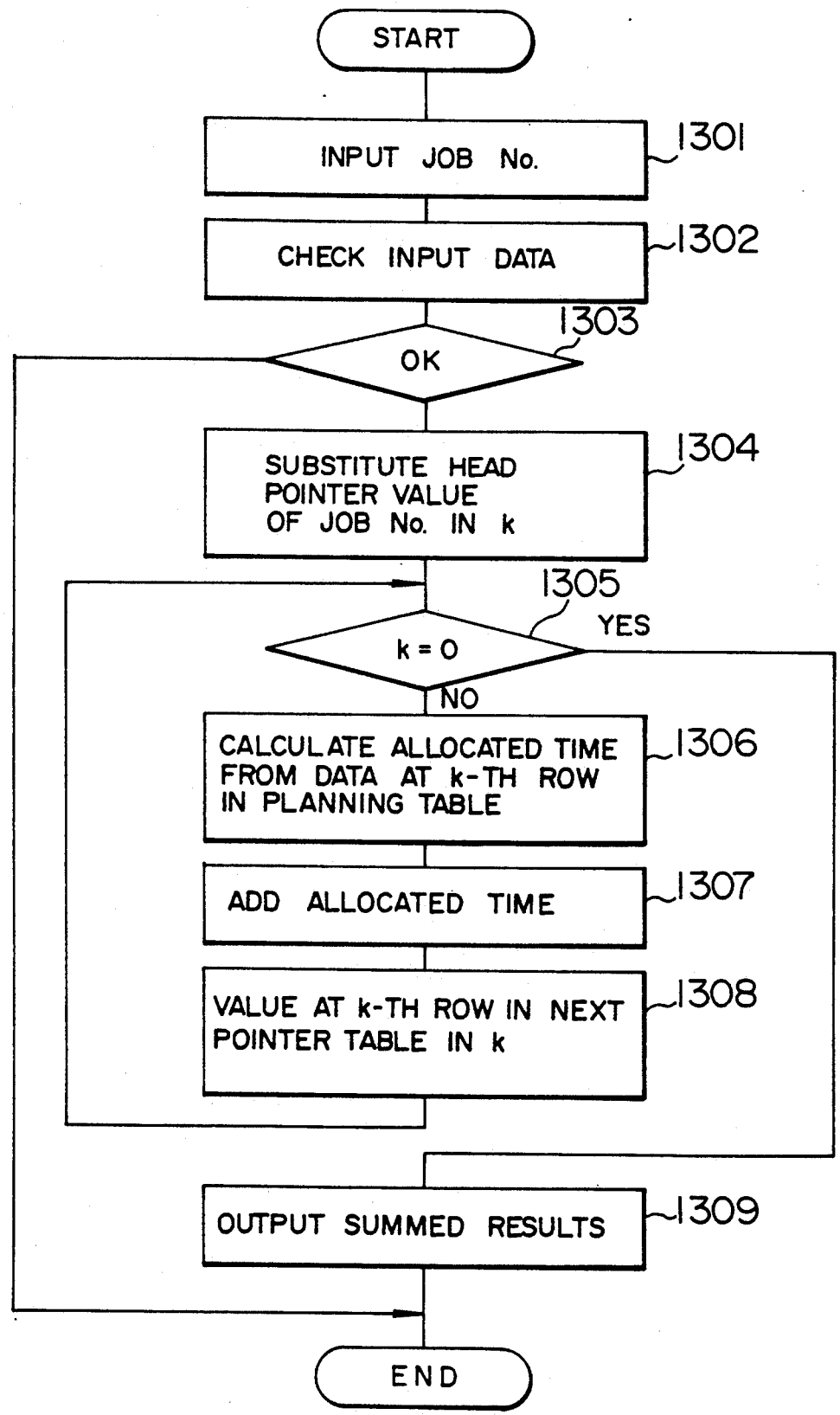
Figure 14:
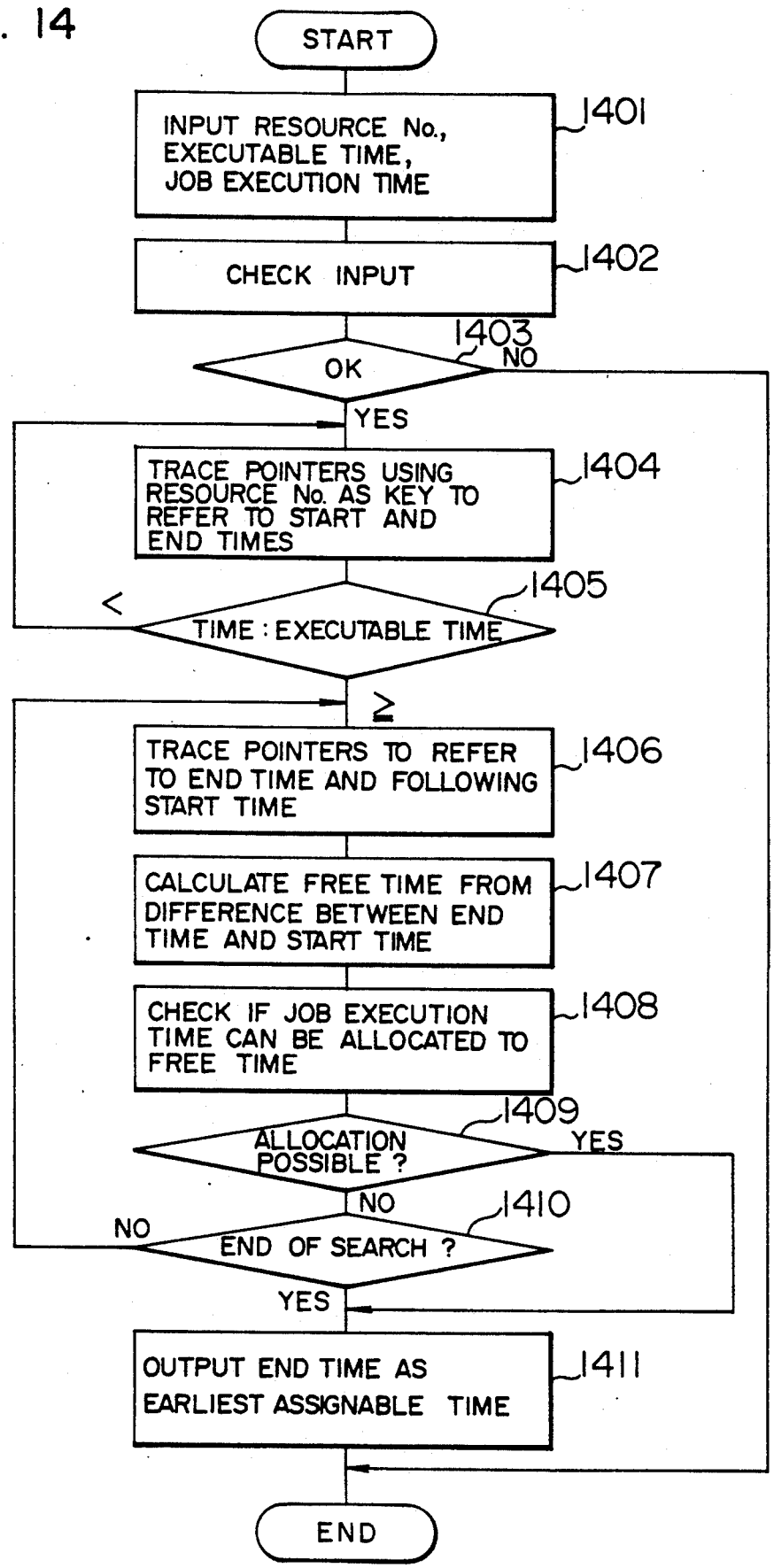

FIG. 4 is a flow chart showing the operation of the planning data processing unit 102. The planning data processing unit 102 first receives a process request from the planning unit 101 (step 401). Next, the planning data processing unit 102 receives a scheduling function planning data processing program corresponding to the received process request (step 402), and in accordance with the received program, the data is processed (step 403) and the results are outputted to the planning unit 101 (step 404).

The flow charts for processing data in accordance with a scheduling function data processing program are shown in FIGS. 10 to 14. The flow charts for the operation of the addition program 701, deletion program 702, reference program 703, sum program 802, and search program 901 are shown in FIGS. 10 to 14, respectively.

With the addition program 701, a data to be added to the planning table is entered first (step 1001). The entered data is checked if it is abnormal, such as the size of data, duplicated assignment of jobs at the same time period in the same resource, or the like (step 1002). If the entered data is abnormal, the process is terminated, and if the entered data is normal, then the addition process continues (step 1003). A vacant area is searched by using the vacant pointer 605 (step 1004) to register the entered data in the vacant area (step 1005). By using the resource number of the entered data as a key, the resource head and next pointers 601 and 602 are sequentially traced to search the registration position (step 1006), and the resource pointers 601 and 602 for the registration position are updated (step 1006). Similarly, by using the job number of the entered data as a key, the registration position is searched (step 1008) and the pointers 603 and 604 for the registration position are updated (step 1009). The processes at steps 1001 to 1010 are repeated until the data to be added are all entered in the planning table.

With the deletion program 702, the resource number and job number to be deleted from the planning table are entered as the deletion condition data (step 1101). It is checked if the entered data is abnormal (step 1102). If the entered data is abnormal, the process is terminated. If not, the deletion process continues (step 1103). Next, by using the resource number of the entered deletion condition data as a key, the resource head and next pointers 601 and 602 are traced time sequentially (step 1104), and the data in the planning table coincident with the job number of the deletion condition data is deleted, e.g., by clearing to "0" such as shown at the fifth row in FIG. 5 (step 1105). The next pointer of the data immediately before the deleted data is updated to point to the data immediately after the deleted data (step 1106). Next, by using the job number deleted as a key, the job head and next pointers 604 and 603 are time sequentially traced (step 1107) to search the deleted data. After this search, the next pointer of the data immediately before the deleted data is updated to point to the data immediately after the deleted data (step 1108). The vacant pointer is updated so as to indicate the row number 500 of the deleted data (step 1109). The processes at steps 1101 to 1110 are repeated to delete data from the planning table until the entered deletion condition data becomes not present.

With the reference program 703, first the resource number and job number to be referred to from the planning table are entered as the reference condition data (step 1201). It is checked if the entered data is abnormal (step 1202). If the entered data is abnormal, the process is terminated. If not, the reference process continues (step 1203). Next, by using the resource number or the job number entered as the reference condition data as a key, resource or job head pointers 601 or 604 and resource or job next pointers are time sequentially traced (step 1201), and the data 501 to 504 in the planning table coincident with the reference data condition is outputted as the reference results (step 1205). The processes at steps 1201 to 1205 are repeated to refer to data in the planning table until the entered reference condition data becomes not present.

With the sum program 802, a job number for a job whose assigned times are to be summed from the planning table is entered (step 1301). It is checked if the entered data is abnormal (step 1302). If abnormal, the process is terminated. If not, the sum process continues (step 1303). By using the entered job number as a key, the value of the job head pointer 604 is substituted in a variable k (step 1304). If the value of the variable is 0, the sum result of 0 is outputted and the process is terminated (steps 1305 and 1309). If the variable k is not 0, the assigned time is obtained from the difference between job start and end times at the row number 500 of the planning table indicated by the variable k (steps 1305 and 1306), and added to the sum result (step 1307). The value of the job next pointer 603 at the row of the next pointer table indicated by the variable k is substituted in the variable k (step 1308). The processes at steps 1305 to 1308 are repeated to sum and output the assigned times until the variable k becomes 0 (step 1309).

With the search program 901, a resource number, job time, and job executable time are entered in order to obtain the earliest start time when the job execution time can be assigned to the designated resource in the planning table (step 1401). It is checked if the entered data is abnormal (step 1402). If abnormal, the process is terminated. If not, the search process continues (step 1403). By using the entered resource number as a key, the resource head and next pointers 601 and 602 are traced time sequentially to thereby time sequentially refer to the start time 503 and end time 504 of the planning data (step 1404). This search continues until the start time 503 and end time 504 become larger than the job executable time (step 1405). Next, while tracing the resource next pointers 602, the end time and the next start time 503 are referred to (step 1406). From the difference of the end time and start time, a free time is calculated (step 1407). The free time is compared with the entered job execution time to check if the job execution time can be assigned (step 1408). If possible, the referred end time is outputted as the earliest assignable time (steps 1409 and 1411). If not, the processes at steps 1406 to 1410 are repeated until the data to be searched becomes not present. If no assignable time is found before the end of this search, the last referred end time is outputted as the earliest assignable time (steps 1410 and 1411).

According to the above embodiment, scheduling function data processing programs are previously stored in the planning support apparatus 1. It becomes therefore unnecessary to describe complicated data accesses in the planning program, thereby reducing the number of steps of the planning program and the number of steps of developing it. It becomes also unnecessary to design the structure of the planning data each time it is changed.

According to the above embodiment, the planning table for storing resource, jobs, and times is provided with the pointer table so that the planning table can be searched time sequentially for each resource and job. As a result, for the reference, sum, and search processes, additional comparison between the entered data and the planning data becomes unnecessary, thereby realizing high speed processing. Furthermore, for the addition and deletion processes, only a part of the pointer table is updated so that an additional sorting process for time sequential search becomes unnecessary, allowing high speed processing.

In addition, according to the above embodiment, the planning table for storing resources, jobs, and times is provided with the pointer table so that the planning table can be searched time sequentially for each resource and job. As a result, the job assignable time and free time can be computed at high speed, without a necessity of a job assignable time table and a free time table for each planning process, thereby suppressing the necessary memory capacity to a minimum.

Next, an example of job scheduling using the planning support system of this invention described above will be given with reference to FIGS. 15 to 18.

FIG. 15A illustrates a flow of products 1505 to 1508 worked with manufacturing apparatus 1502 to 1504 at a manufacturing step 1501 and outputting manufactured products 1509 to 1512. The manufacturing ability of each apparatus for each product is given in a table 1513 shown in FIG. 15B. For example, the table indicates that it takes one minute for the apparatus A to manufacture a product a.

An example of job data to be planned is shown in FIG. 16A, and an example of the resource data to be planned is shown in FIG. 16B. In FIG. 16A, reference numeral 1601 represents a job identification number, 1602 a name of a product to be worked, 1603 the number of products to be worked, 1604 a job assignable time, and 1605 a due time for the completion of a job. In FIG. 16B, reference numeral 1606 represents a resource identification number, 1607 a name of a manufacturing apparatus, and 1608 and 1609 start and end times serviceable by an apparatus.

Figure 17:
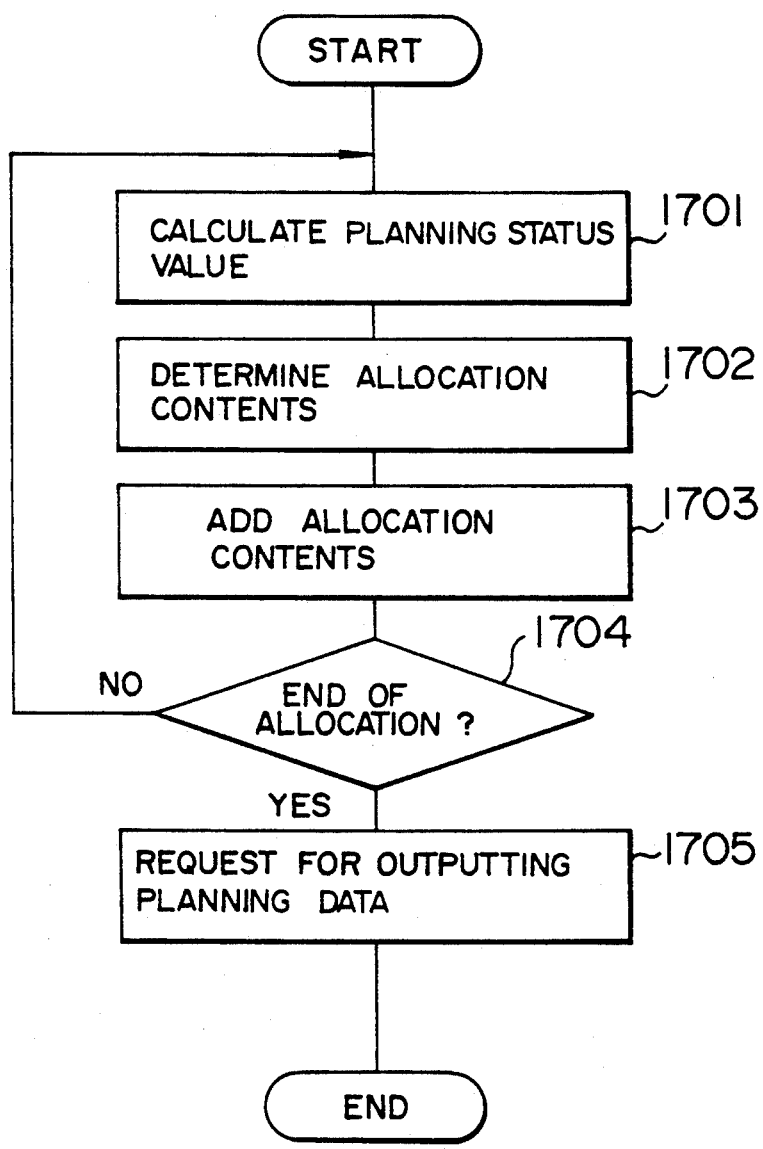
FIG. 17 is a flow chart showing the operation of a planning unit.

A flow chart for the operation of the planning unit 101 (refer to FIG. 1) used for job scheduling is shown in FIG. 17. In this embodiment, for the planning support for job scheduling, a characteristic value (spare time to due date) during the course of job scheduling is first calculated while referring to the contents of the planning data storage unit 105 by the planning data processing unit 102 (step 1701). Next, in accordance with the calculated planning status value, a combination of resources and jobs and the assignable times for the combination are determined (step 1702). The planning data processing unit 102 adds the determined combination and its assignable times to the planning data storage unit 105 in accordance with the addition program (step 1703). The processes at steps 1701 to 1703 are repeated to make a plan until all jobs are allocated to corresponding resources. The obtained plan data is outputted via the planning data processing unit 102 to the planning information output device 4 to print it out (steps 1704 and 1705).

FIG. 18 shows an example of a program for calculating a planning status value for job scheduling. The program shown in FIG. 18 is a part of the planning program for obtaining the spare time to due date (characteristic value) in the case where a job is newly allocated to a resource. Steps 1801 and 1809 shown in FIG. 18 are the steps at the start and end of the program. Step 1802 defines suffixes of a resource and a job. Steps 1803 and 1808 are the steps at the start and end of calculation. Step 1804 is a step for calculating a spare time to a due date of a resource and a job satisfying the constraints of the spare time to a due date and the constraints of the apparatus, while referring to the planning data stored in the planning data storage unit 105. Step 1805 is a step for calculating to determine if the spare time to a due date is satisfied. Step 1807 is a step for calculating a job time of a job allocated to an apparatus while referring to the ability table 1513. At steps 1804, 1805 and 1806, the allocation contents stored in the planning data storage unit 105 are referred to, and the spare time to a due date, due date constraints and apparatus constraints are calculated, in accordance with the programs (refer to FIGS. 8 and 9) stored in the scheduling function storage unit 106 such as "lstime", "fstime", "fetime", and "ratime" programs.

In job scheduling of this embodiment, job allocation is made while referring to the allocation status stored in the planning data storage unit 105. An allocation not meeting the constraints is not allowed, thereby realizing an efficient allocation and making a plan at high speed. Furthermore, it is not necessary for the development of a planning program to store complicated programming steps in the planning program storage unit 104 for the access to the contents of the planning data storage unit 105.

Figure 20:
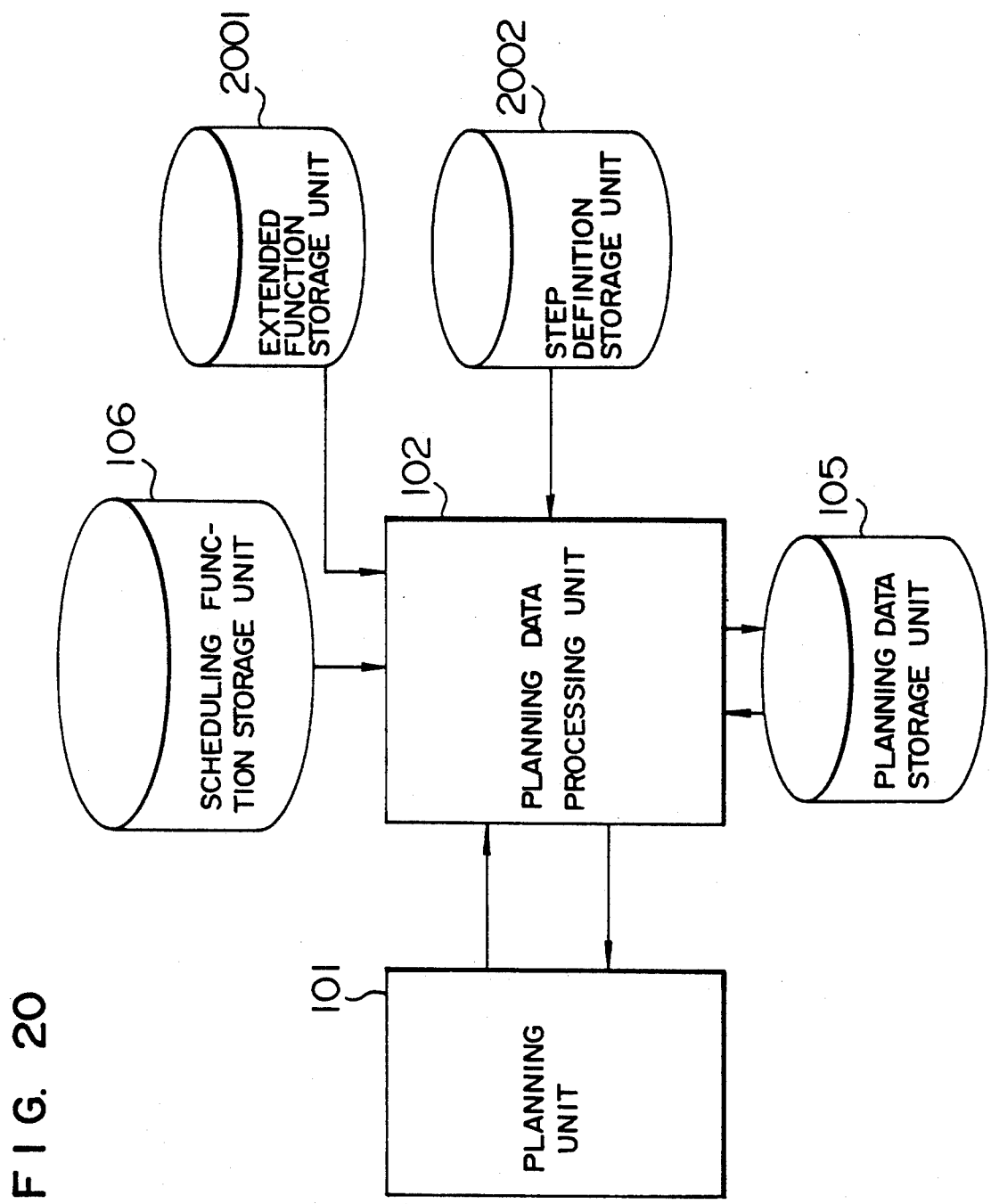
FIG. 20 shows a modification of the planning data processing unit.

Another example of job scheduling using the planning support system of this invention will be described with reference to FIGS. 19A, 19B and 20. FIG. 19A shows a flow of products 1911 to 1913 to be worked with manufacturing apparatus 1904 to 1910 at a plurality of steps 1901 to 1903 to be scheduled. The manufacturing ability for each product is given in an ability table shown in FIG. 19B. The contents of data are the same as shown in FIGS. 16A and 16B. This planning support system for job scheduling is similar to the system shown in FIGS. 16 to 18 except that an extended function storage unit 2001 and a step order table 2002 shown in FIG. 20 are additionally used, and except for the operation flow of the planning data processing unit 102.

It is necessary for step scheduling to have a process for calculating job assignable times for a plurality of appartus. The program for this purpose is stored in the extended function storage unit 2001. Upon reception of a process request from the planning unit 101 for calculating job assignable times for a plurality of appartus, the planning data processing unit 102 receives the data processing program from the extended function storage unit 2001 to search a job assignable time while referring to the step order and the apparatus name for each step stored in the step order table and to output it to the planning unit 101. The planning unit 101 receiving job assignable times and other data makes a plan.

According to the scheduling of this embodiment, programs for processing the planning data for a plurality of steps are previously stored in the extended function storage unit 2001. Therefore, it is not necessary to store in the planning program storage unit complicated program steps for the access to the contents of the program data storage unit 105. Furthermore, an extended function can be easily developed by merely combining processing programs for a resource stored in the scheduling function storage unit 106.

In the production scheduling or operation assignment of this embodiment, the entered operation time is allocated in accordance with the object data for the purpose of making a plan. The production scheduling or operation assignment of this embodiment is also applicable to scheduling of the type that a job is allocated to the time axis of a resource by searching job assignable times, or conversely to scheduling of the type that a given job is composed to another job having as large a scale as possible which is then allocated to the time axis of a resource by searching job assignable times.

Furthermore, in the above embodiments, a planning data has been stored which allows to allocate one job at the same time period of a resource. It is possible to make a plan while allocating a plurality of jobs at the same time period, by considering a plurality of resources as a single group. In such a case, the planning support system may be provided with a process for displaying a job pile table to smooth the load of the planning contents. This load smoothing can be realized with a known method such as "PERT".

Figure 21:
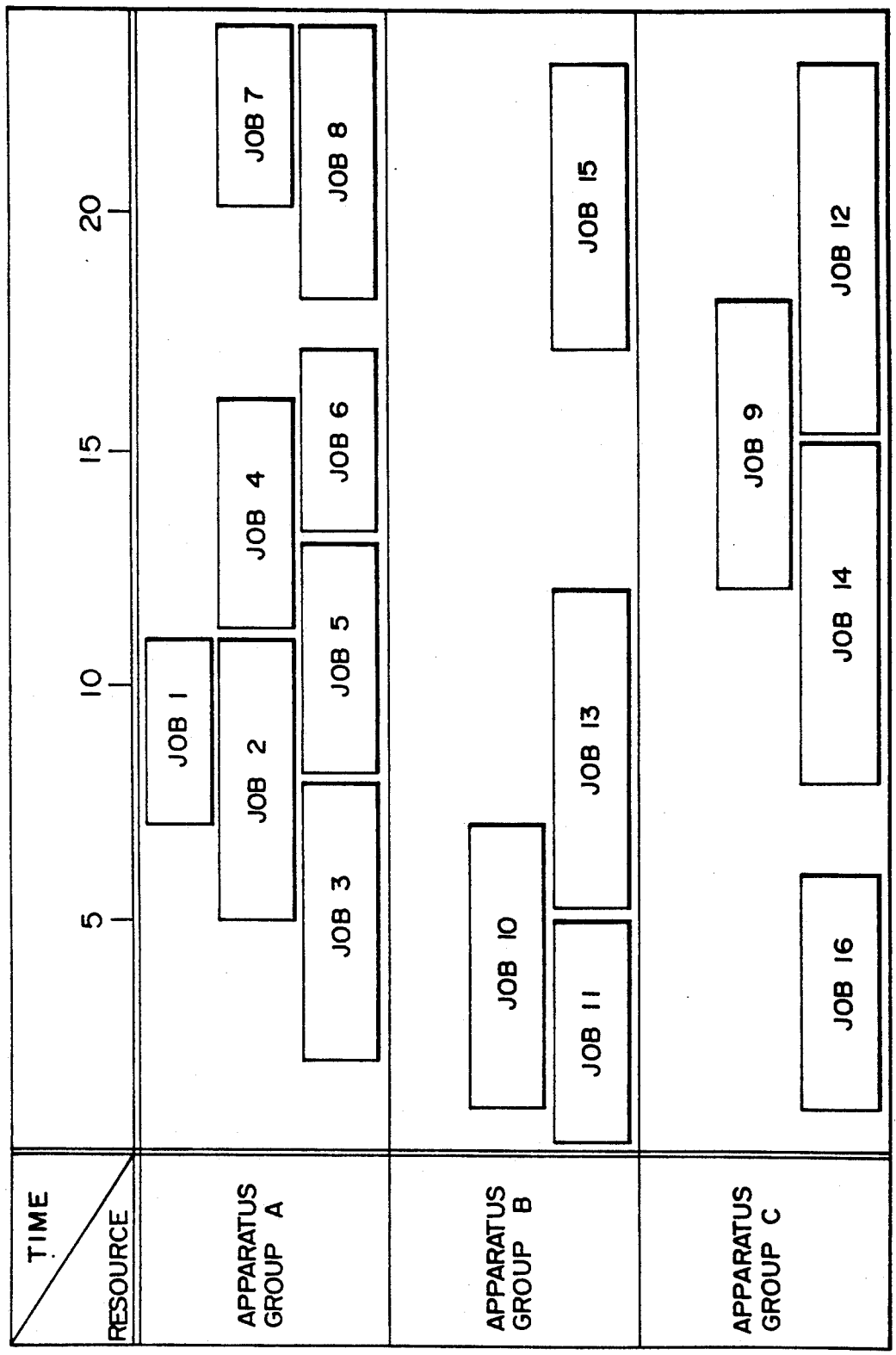

In the above embodiments, a combination of object data and job assignable start and end times are stored in the planning data storage unit 105. Instead of the job assignable start and end times, a data representative of time scheduling may be stored in the planning data storage unit 105 for a planning issue which has been given the prescribed time scheduling. In such a case, the planning support system may be provided with a process for displaying a job time scheduling table such as shown in FIGS. 21, 22A and 22B, to thereby allow to make a plan in accordance with the time scheduling.

Figure 23:
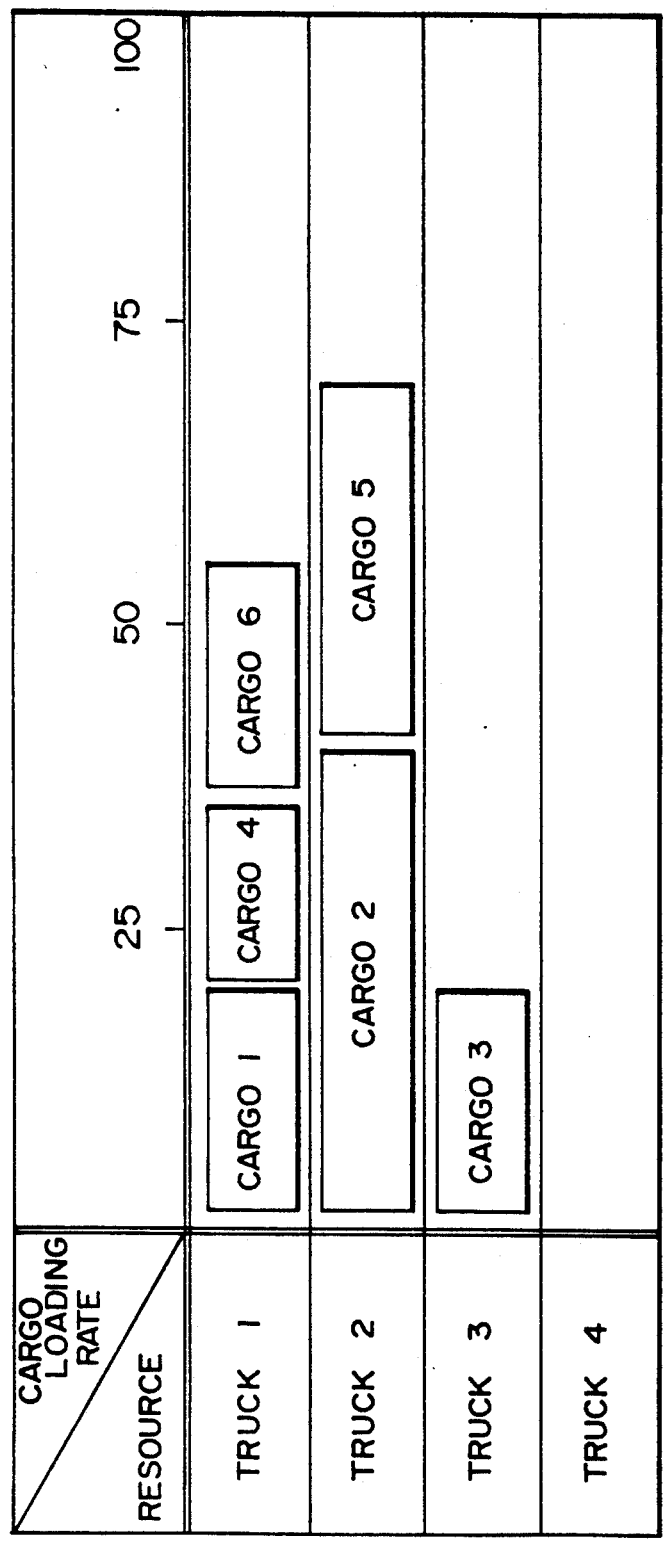

Furthermore, in the above embodiment, the time sequential data such as the job start and end times and time scheduling are stored in the planning data storage unit 105. Instead of the time sequential data, a planning data without time may be stored such as shown in FIG. 23 which shows an example of planning the contents of cargoes loaded on trucks. For such a planning issue, the load percentage of cargoes in respective trucks is stored as the planning data in the planning data storage unit 105, and a plan is made by providing the planning data processing unit 102 for summing the load percentage of each truck and searching the amount of laudable cargoes.

The second embodiment of this invention will then be described.

Figure 24:
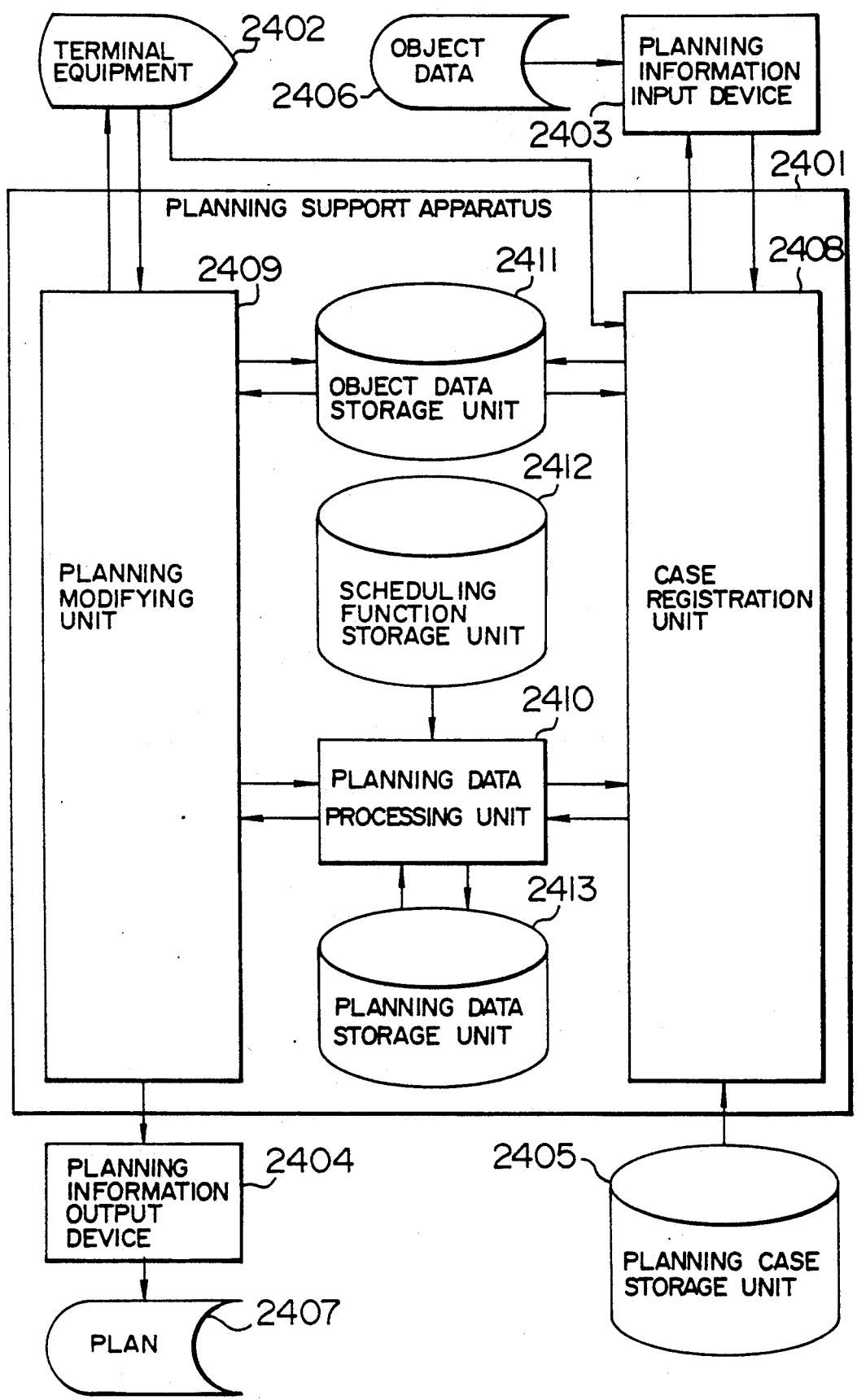
FIG. 24 is a block diagram showing a second embodiment of the planning support system.

FIG. 24 is a block diagram showing the second embodiment of the planning support system according to the present invention. The planning support system of this embodiment is constructed of a planning support apparatus 2401, a terminal equipment 2402, a planning information input device 2403, planning information output device 2407, and a planning case storage apparatus 2405. The planning support apparatus 2401, terminal equipments, planning information input device 2403, and planning information output device 2404 corresponding to the planning support apparatus 1, terminal equipment 2, planning information input device 3, and planning information output device 4, respectively of the first embodiment.

The planning support apparatus 2401 is constructed of a case registration unit 2408, a planning modifying unit 2409, a planning data processing unit 2410, an object data storage unit 2411, a scheduling function storage unit 2412, and a planning data storage unit 2413.

The planning data processing unit 2410, object data storage unit 2411, scheduling function storage unit 2412, and planning data storage unit 2413 correspond to the planning data processing unit 102, object data storage unit 107, scheduling function storage unit 106, and planning data storage unit 105 respectively shown in the first embodiment.

The planning support apparatus 2401 receives precedent planning data generated in the past planning and object data concerning the precedent planning data from the precedent planning case storage unit 2405, and generates a new plan on the basis of these data and newly inputted object data. The case registration unit 2408 compares the object data of the precedent with the newly inputted object data so that the new object data similar to the precedent object data is replaced by the precedent object data to register new planning data. The planning modifying unit 2409, in response to the modification request by a user, makes modification of the registered planning data and addition of assigned contents of the object data which was not replaced so as to complete the plan.

Figure 25:
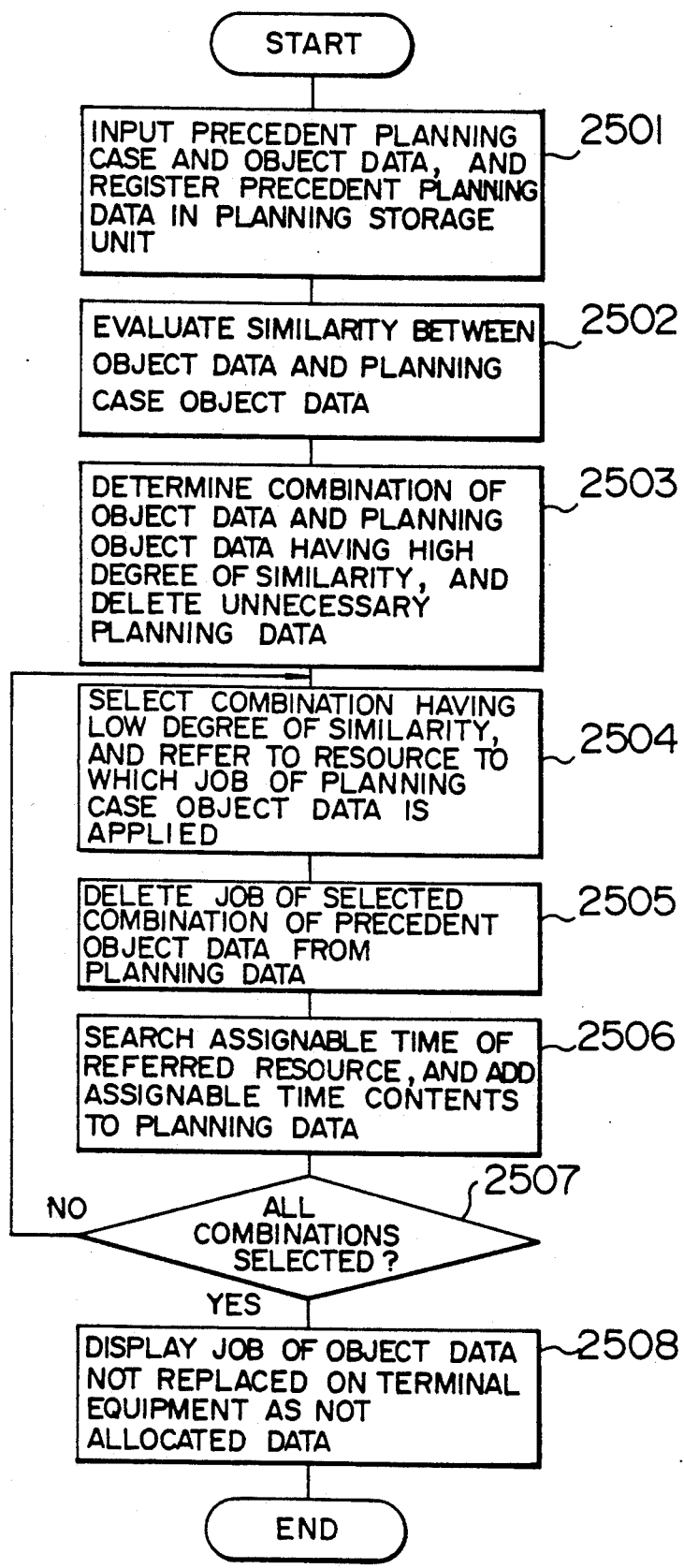
FIG. 25 is a flow chart showing the operation of a case registration unit.

The processes at the case registration unit 2408 and planning modifying unit 2409 will be described with reference to FIGS. 25 to 29. FIG. 25 is a flow chart showing the processes at the case registration unit 2408. The case registration unit 2408 first receives the object data and planning data of a planning case, and stores the planning data of the planning case in the planning data storage unit 2413 (step 2501). Next, the degree of similarity between a job of the object data 2406 and a job of the object data of the planning case is evaluated (step 2502). An example of a program for calculating the degree of similarity is shown in FIG. 26, and an example of the calculation results is shown in FIGS. 27A and 27B. Referring to FIG. 26, steps 2601 and 2609 are the steps at the start and end of the calculation program. Step 2602 is a step for defining suffixes for discriminating jobs between the object data 2406 and the object data of a planning case. Steps 2603 and 2608 are steps at the start and end of calculation. Step 2604 is a step for calculating the degree of similarity. A step 2605 is a step for calculating the degree of similarity with relative to the job amount. A step 2606 is a step for calculating the degree of similarity relative to the job time period. A step 2607 is a step for calculating the working rate of job execution time periods. With the program for evaluating the degree of similarity shown in FIG. 26, the degree of similarity is high for a job having a shorter working time if the working rate of job execution time periods is high, and for a job having a longer working time if the working rate is low. Thus, a job easy to be allocated is evaluated as having a high degree of similarity.

A combination of the object data to be replaced and the object data of the planning case is determined from combinations having a high degree of similarity as shown in FIGS. 27A and 27B, and the planning data not associated with the determined combination is deleted from the planning data storage unit 2413 (step 2503). FIG. 27A shows the evaluation results of the degree of similarity, and FIG. 27B shows an example of combinations of the object data to be replaced and the object data of the planning case, the combinations being determined from the degree of similarity.

Next, a desired combination is selected from the determined combinations to refer to a resource to which the object data of the planning case is allocated (step 2504). The planning data associated with a job of the object data of the planning cases in the combinations are deleted from the planning data storage unit 2413 (step 2505). A job assignable time is searched and determined for the referred resource, and the planning data is stored in the planning data storage unit 2413 (step 2506). FIG. 28A shows the planning case data stored in the planning case storage unit 2405, FIG. 28B shows the planning data replaced at steps 2504 to 2506 and stored in the planning data storage unit 2413, and FIG. 28C shows the data of a job not assigned. The processes at steps 2504 to 2506 are repeated until all combinations are selected and the planning data is replaced with a new job (step 2507). The object data of a job not replaced is displayed on the terminal equipment 2402 as the not-allocated data (step 2508).

Figure 29:
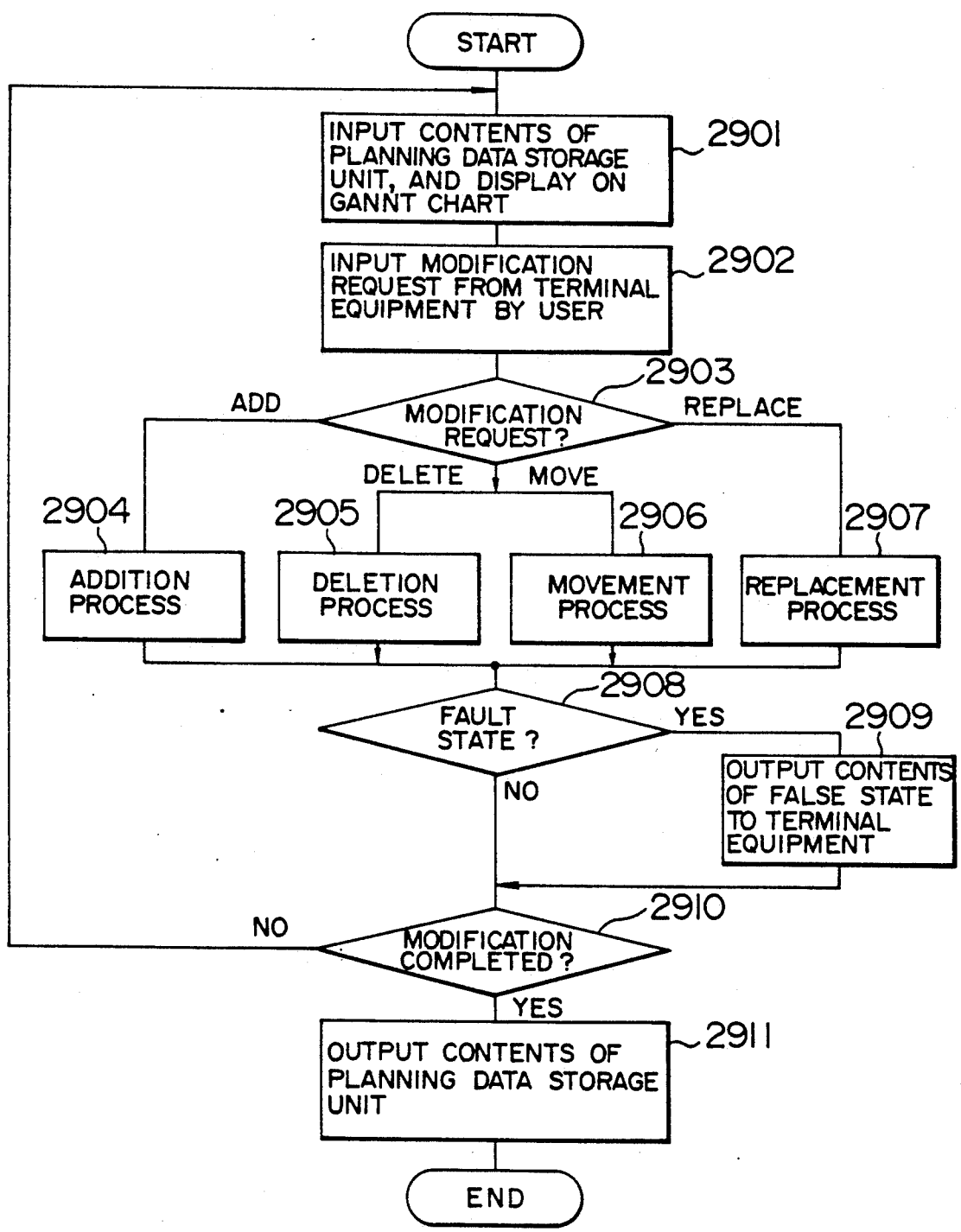
FIG. 29 is a flow chart showing the operation of the case registration unit.

The processes of the planning modifying unit 2409 will be described with reference to the flow chart shown in FIG. 29. The planning modifying unit 2409 receives the contents of the planning data storage unit 2413 via the planning data processing unit 2410 to display the planning contents on the terminal equipment 2402 in the form of a gantt-chart shown in FIG. 3 (step 2901). Next, a modification request by a user is received from the terminal equipment 2402 (step 2902). In accordance with the modification request, the process of adding, deleting, moving, or replacing the planning data is executed (steps 2903 to 2907). If the modification contents are of a fault state such as duplicated allocation, such an effect is displayed on the terminal equipment 2402 (steps 2808 and 2809). The processes at steps 2901 to 2909 are repeated until the modification is completed (step 2910). Upon completion of the modification, the contents of the planning data storage unit 2413 are outputted to the planning information output device 2404 (step 2911).

According to this embodiment, a plan is made basing upon the data of planning cases generated in the past. Therefore, an obtained plan and its work procedure is similar to the contents of a plan generated in the past, thereby allowing an execution of the plan with familiar work procedure. Moreover, if a plan is to be made with less modified object data, it takes less calculation time for making a plan and less operation time for modifying the plan, thereby efficiently making the plan.

For the program development for the case registration unit 2408 and planning modifying unit 2409, the planning data processing unit 2410 and planning data storage unit 2413 of this invention can be used without developing a program of the planning data processing, thereby allowing a speedy development of a case based planning support apparatus.

As appreciated from the foregoing detailed description of the present invention, a planning system including a planning information input device for inputting an object data used for making a plan, a planning unit for making a plan, and a planning information output device for outputting a planning data resulting from making a plan, is provided with an object data storage unit for storing the object data inputted from the planning information input device, a planning data storage unit for storing the planning data generated by the planning unit, and a planning data processing unit for referring to and updating the planning data generated by the planning unit and stored in the planning data storage unit in response to a request for accessing the planning data from the planning unit or the planning information output unit, thereby realizing a planning support system capable of speedily developing various planning systems while reducing the number of steps of developing a planning program. Furthermore, according to the present invention, it is possible to store the planning data so that it can be shared between various processes of a planning system, thereby improving a use efficiency of a storage unit. Moreover, processing the planning data can be shared between systems making various plans, thereby reducing the number of steps for developing and maintaining a planning system.

Furthermore, by using the planning support system of this invention, it is possible to realize an efficient scheduling system by providing a data storage unit for storing a combination of object data and a data storage unit for storing a combination of resources and jobs and respective job assigned start and end times.

What is claimed is:

1. A computer aided planning support system, comprising:

planning information input means for inputting an object data for making a plan;

object data storage means for storing said object data inputted by said input means;

planning means for reading said object data from said object data storage means and processing said object data in accordance with a planning program to make said plan;

planning data storage means for storing planning data associated with said plan by said planning means;

planning case data storage means for storing precedent planning data and precedent object data wherein said precedent planning data and said precedent object data are data which have been previously generated;

means for comparing said object data stored in said object data storage means with said precedent object data stored in said planning case data storage means;

means for determining a combination of said precedent object data having a greater degree of similarity with said object data than other precedent object data stored in the planning case data storage means have;

said planning means for making said plan by modifying said precedent object data having said greater degree of similarity;

planning data processing means responsive to a data process request from said planning means for processing said planning data stored in said planning data storage means in accordance with a predetermined scheduling function, and sending said processed data to said planning means; and planning output means for receiving said plan made by said planning means and outputting said plan in a usable form.

2. The computer aided planning support system according to claim 1, wherein said planning program of said planning means includes a program for generating at least one of a Gantt chart, cargo pile table, and time scheduling table, respectively, regarding a production plan.

3. A computer aided planning support system, comprising:

planning information input means for inputting an object data for making a plan;

object data storage means for storing said object data inputted by said input means;

planning means for reading said object data from said object data storage means and processing said object data in accordance with a planning program to make said plan;

planning data storage means for storing planning data associated with said plan by said planning means;

planning case data storage means for storing precedent planning data and precedent object data wherein said precedent planning data and said precedent object data are data which have been previously generated;

means for comparing said object data stored in said object data storage means with said precedent object data stored in said planning case data storage means;

means for determining a combination of said precedent object data having a greater degree of similarity with said object data than other precedent object data stored in the planning case data storage means have;

said planning means for making said plan by modifying said precedent object data having said greater degree of similarity;

planning data processing means responsive to a data process request from said planning means for processing said planning data associated with said plan stored in said planning data storage means in accordance with a predetermined scheduling function, and sending said processed data to said planning means, wherein said planning data processing means includes means for providing said predetermined scheduling function with at least one of a function for adding said planning data to said planning data storage means, deleting said planning data stored in said planning data storage means, referring only to the planning data satisfying a certain condition and stored in said planning data storage means, statistically processing said planning data stored in said planning data storage means by using a predetermined data item as an index, and performing an arithmetical operation on the planning data stored in said planning data storage means; and planning output means for receiving said plan made by said planning means and outputting said plan in a usable form.

4. The computer aided planning support system according to claim 3, wherein said planning program of said planning means includes a program for generating at least one of a Gantt chart, cargo pile table, and time scheduling table, respectively, regarding a production plan.

5. The computer aided planning support system according to claim 4, wherein said planning support system further comprises means for detecting when said planning data cannot be added to said planning data storage means when executing said predetermined scheduling function.

6. The computer aided planning support system according to claim 3, wherein said planning support system further comprises means for detecting when said planning data cannot be added to said planning data storage means when executing said predetermined scheduling function.

7. A computer aided planning support system, comprising:

planning information input means for inputting object data for making a plan;

object data storage means for storing said object data inputted by said input means;

planning means for reading said object data from said object data storage means and processing said object data in accordance with a planning program to make said plan;

planning data storage means for storing a planning data associated with said plan by said planning means;

said object data storage means including means for storing said planning data in a table form comprising a combination of data items different from each other and used to develop said plan, and search table means for searching said planning data in said table form;

planning case data storage means for storing precedent planning data and precedent object data wherein said precedent planning data and said precedent object data are data which have been previously generated;

means for comparing said object data stored in said object data storage means with said precedent object data stored in said planning case data storage means;

means for determining a combination of said precedent object data having a greater degree of similarity with said object data than other precedent object data stored in the planning case data storage means have;

said planning means for making said plan by modifying said precedent object data having said greater degree of similarity;

planning data processing means responsive to a data process request from said planning means for processing said planning data stored in said planning data storage means in accordance with a predetermined scheduling function, and sending said processed data to said planning means; and planning output means for receiving said plan made by said planning means and outputting said plan in a usable form.

8. The computer aided planning support system according to claim 7, wherein said planning program of said planning means includes a program for generating at least one of a Gantt chart, cargo pile table, and time scheduling table, respectively, regarding a production plan.

9. The computer aided planning support system according to claim 8, wherein said means for storing said planning data in the table form of a table comprising a combination of data items has a storage area for storing an item comprising a combination of a resource and a job to be planned and an item comprising a job start time and a job end time assigned to said resource.

10. The computer aided planning support system according to claim 7, wherein said means for storing said planning data in a table form comprising a combination of data items has a storage area for storing an item comprising a combination of a resource and a job to be planned and an item comprising a job start time and a job end time assigned to said resource.

11. The computer aided planning support system according to claim 7, wherein said planning support system further comprises means for detecting when said planning data cannot be added to said planning data storage means when executing said predetermined scheduling function.

12. The computer aided planning support system according to claim 7, wherein said means for storing said planning data in a table form has a storage area for storing an item comprising a combination of a resource and a job to be planned and an item comprising a job start time and a job end time assigned to a resource.

13. The computer aided planning support system according to claim 12, wherein said planning data processing means includes at least one function for summing times assigned to a resource or job in a planning data item, and a function for searching said summed times assigned to said resource or job.

14. The computer aided planning support system according to claim 13, wherein said planning means includes means for allocating a job with respect to a time axis on said resource.

15. The computer aided planning support system according to claim 13, wherein said planning means includes means for dividing a given job into several tasks and allocating said tasks with respect to a time axis on said resource.

16. The computer aided planning support system according to claim 13, wherein said planning means includes means for composing a given task into several jobs and allocating said jobs with respect to the time axis of said resource.

17. The computer aided planning support system according to claim 12, wherein said planning means includes means for allocating a job with respect to a time axis on said resource.

18. The computer aided planning support system according to claim 12, wherein said planning means includes means for dividing a given job into several tasks and allocating said tasks with respect to a time axis on said resource.

19. The computer aided planning support system according to claim 17, wherein said planning means includes means for composing a given task into several jobs and allocating said jobs with respect to a time axis of said resource.

20. The computer aided planning support system according to claim 7, wherein said planning support system further comprises means for detecting when said planning data cannot be added to said planning data storage means when executing said predetermined scheduling function.

21. A computer aided planning support system, comprising:
   planning information input means for inputting object data for making a plan;
   object data storage means for storing said object data inputted by said input means;
   planning means for reading said object data from said object data storage means and processing said object data in accordance with a planning program to make said plan, wherein said planning program includes a program for generating at least one of a Gantt chart, cargo pile table, and time scheduling table, respectively, regarding a production plan;
   planning data storage means for storing a planning data associated with said plan by said planning means;
   planning data processing means responsive to a data process request from said planning means for processing said planning data stored in said planning data storage means in accordance with a predetermined scheduling function, and sending said processed data to said planning means, wherein said planning data processing means includes means for providing said predetermined scheduling function with at least one of a function for adding said planning data to said planning data storage means, deleting said planning data stored in said planning data storage means, referring only to the planning data satisfying a certain condition and stored in said planning data storage means, statistically processing said planning data stored in said planning data storage means by using a predetermined data item as an index, and performing an arithmetical operation on the planning data stored in said planning data storage means;
   means for detecting when said planning data cannot be added to said planning data storage means when executing said predetermined scheduling function; and
   planning output means for receiving said plan made by said planning means and outputting said plan in a usable form.

22. A computer aided planning support system, comprising:
   planning information input means for inputting an object data for making a plan;
   object data storage means for storing said object data inputted by said input means;
   planning means for reading said object data from said object data storage means and processing said object data in accordance with a planning program to make said plan;
   planning data storage means for storing planning data associated with said plan by said planning means;
   planning data processing means responsive to a data process request from said planning means for processing said planning data stored in said planning data storage means in accordance with a predetermined scheduling function, and sending said processed data to said planning means, wherein said planning data processing means includes means for providing said predetermined scheduling function with at least one of a function for adding said planning data to said planning data storage means, deleting said planning data stored in said planning data storage means, referring only to the planning data satisfying a certain condition and stored in said planning data storage means, statistically processing said planning data stored in said planning data storage means by using a predetermined data item as an index, and performing an arithmetical operation on the planning data stored in said planning data storage means;
   means for detecting when said planning data cannot be added to said planning data storage means when executing said predetermined scheduling function; and
   planning output means for receiving said plan made by said planning means and outputting said plan in a usable form.

23. The computer aided planning support system according to claim 22, wherein said planning support system further comprises means for outputting the contents of said data which cannot be added.

* * * * *